(12) United States Patent
Henshall

(10) Patent No.: US 12,189,619 B2
(45) Date of Patent: *Jan. 7, 2025

(54) SYSTEMS AND METHODS BASED ON GENERALIZED MULTI-LEVEL SEARCH HEURISTIC FOR PRODUCTION NETWORK MODELS

(71) Applicant: Kinaxis Inc., Ottawa (CA)

(72) Inventor: Dane Henshall, Ottawa (CA)

(73) Assignee: Kinaxis Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,886

(22) Filed: Jun. 28, 2023

(65) Prior Publication Data

US 2023/0418816 A1     Dec. 28, 2023

Related U.S. Application Data

(60) Provisional application No. 63/356,306, filed on Jun. 28, 2022, provisional application No. 63/356,315, filed on Jun. 28, 2022, provisional application No. 63/356,302, filed on Jun. 28, 2022.

(51) Int. Cl.
*G06F 7/00* (2006.01)
*G06F 16/2453* (2019.01)

(52) U.S. Cl.
CPC ................ *G06F 16/2453* (2019.01)

(58) Field of Classification Search
CPC ............... G06F 16/242; G06F 16/2453; G06F 16/90334; G06Q 10/06; G06Q 10/0633; G06Q 10/04; G06Q 10/0875; G06Q 10/06313; G06Q 10/08; G06Q 10/06315; G06Q 10/06375
See application file for complete search history.

(56) References Cited

U.S. PATENT DOCUMENTS

| | | | |
|---|---|---|---|
| 8,290,607 B2 | 10/2012 | Couronne et al. | |
| 8,429,035 B1 | 4/2013 | Kamath et al. | |
| 9,396,163 B2 | 7/2016 | Moll et al. | |
| 9,754,232 B2 | 9/2017 | Kamath et al. | |
| 10,073,813 B2 | 9/2018 | Beraudier et al. | |
| 10,325,237 B2 | 6/2019 | Kamath et al. | |
| 11,132,632 B2 * | 9/2021 | Raymond | G06Q 10/087 |
| 2002/0156663 A1 | 10/2002 | Weber et al. | |
| 2011/0270646 A1 | 11/2011 | Prasanna et al. | |
| 2014/0122390 A1 | 5/2014 | Narisetty et al. | |
| 2016/0231928 A1 * | 8/2016 | Lewis | G06F 3/0638 |
| 2016/0335223 A1 | 11/2016 | Zeng et al. | |
| 2017/0352003 A1 | 12/2017 | Bertoli et al. | |
| 2019/0311309 A1 | 10/2019 | Kamath et al. | |
| 2020/0258169 A1 * | 8/2020 | Chen | G06Q 10/04 |
| 2022/0044110 A1 * | 2/2022 | Ryu | G06N 3/08 |
| 2023/0074148 A1 * | 3/2023 | Di Cairano | G06N 3/084 |

OTHER PUBLICATIONS

U.S. Appl. No. 18/478,142, Non-Final Office Action dated Nov. 7, 2024.

* cited by examiner

*Primary Examiner* — Mohammad A Sana
(74) *Attorney, Agent, or Firm* — BORDEN LADNER GERVAIS LLP; Curtis Behmann

(57) ABSTRACT

Disclosed herein are methods and systems that construct an optimization capability that is able to solve optimization models of supply chain problems faster and with higher quality solutions than prior approaches.

15 Claims, 18 Drawing Sheets

| Weeks in Horizon | Network Solver Time | MIP Time |
|---|---|---|
| 1 | 2.78 | 53.49 |
| 2 | 3.70 | 3600.00 |
| 3 | 4.98 | 3600.00 |
| 4 | 6.23 | 3600.00 |

SYSTEMS AND METHODS BASED ON GENERALIZED MULTI-LEVEL SEARCH HEURISTIC FOR PRODUCTION NETWORK MODELS

CROSS-REFERENCE TO RELATED APPLICATIONS

The present application claims the benefit of U.S. Provisional Patent Application No. 63/356,315 filed Jun. 28, 2022, U.S. Provisional Patent Application No. 63/356,302 filed Jun. 28, 2022 and U.S. Provisional Patent Application 63/356,306 filed Jun. 28, 2022, each of which are incorporated entirely herein by reference.

BACKGROUND

Supply chains are complex entities that involve millions of touch points comprising resources, manufacturing, shipping, distribution across many countries, continents and time zones. Supply chain planners seek to optimize supply chains for maximum efficiency—not only maximum efficiency of the supply chain, but also enhanced efficiency of computational resources used to map out supply chains.

In general, most technical solutions strike some balance between characteristics such as generality, speed and solution quality. That is, the generality of a solution refers to a solution being general enough to cover a broad variety of the problems that are encountered. Often times, these characteristics are at odds with each other. For example, some techniques that yield a high-quality solution, are slow, and/or, refer to specific problems (as opposed to generalized problems).

One approach for optimization of supply chain planning is use of standard tools for optimization of supply chain planning. A standard tool for defining models for an optimizer is Mixed Integer Programming (MIP). There are a number of commercially available MIP solvers that aim to solve these models.

However, one of the drawbacks of MIP modelling techniques is that these techniques do not, and cannot, encode the directionality of supply and demand that is required by developers when creating high-performance methods and systems.

Furthermore, many of the models that are used in complex supply chain problems, are too large to be solved in a useful amount of time with standard MIP algorithms. In addition, efficient network algorithms that have been developed for supply chain planning, cannot run on standard MIP models, since standard MIP models do not encode for the flow of supply to demand (that is, directionality).

There are other drawbacks. For example, while there already exists standard techniques for translating MIP models (with a special structure) to network models, these techniques are not able to handle the situation where a variable has more than two constraints. This makes existing techniques unsuitable for supply chain planning, since many of the problems that need to be solved cannot be modelled using MIPs that have limitations on the number of constraints per variable.

Currently, most approaches are either general and slow; or specific and fast. It is It is difficult to achieve the goal of achieving systems and methods for optimization that are both general and fast.

BRIEF SUMMARY

Disclosed herein are methods and systems that construct an optimization capability that is able to solve optimization models of supply chain problems faster and with higher quality solutions than prior approaches. These methods and systems are also referred to as a "network solver".

Disclosed herein are methods and systems that comprise the following characteristics in supply chain optimization: a) general enough to cover a broad variety of the problems encountered in supply chain planning; b) computationally very fast, so users can quickly iterate by changing inputs and observing impact on solution; and c) begin with good solution quality, while allowing for a configurable speed/quality tradeoff.

Disclosed herein are methods and systems that comprise the following capabilities: a) a parameterized heuristic that is generalized for supply chain planning; and b) a suite of meta-heuristics that can be run on top of the general heuristic to improve solution quality.

Disclosed herein is a computer-implemented method that can map an MIP into a network, such that variables with more than two constraints are translated onto a new type of network node (called a "Production Node"). A production node represents a proportionality constraint and requires feasible solutions to have proportional flow across all arcs into the production node (called "in-arcs") and all arcs out of the production node (called "out-arcs").

In the standard mapping of a MIP to a network, every constraint becomes a node. However, a production node operates differently; it has exactly one arc (for every non-zero coefficient of the original variable) between a new production node and the node representing the constraint of the non-zero coefficient.

In addition to introduction of production nodes, the computer-implemented method also includes directed arcs that enable application of techniques such as backwards-planning and forwards-planning (in supply chain planning). That is to say, each arc has a source and a destination and represents a flow from a source node to a destination node.

In order to enable directed arcs and production nodes with minimal changes to a standard MIP model, a parity bit is created that represents a multiplier of '1' or '−1' to be multiplied against every coefficient in the constraint. This allows for the normalization of constraints so that a customized definition of directionality can be applied onto existing MIP models. After the model is normalized, the direction of the constraint can be easily determined by simply taking all variables, with positive coefficients, as representing in-arcs and all variables, with negative coefficients, as representing out-arcs.

In this disclosure, the term "Multi-Level Search" is used to denote a method that walks up and down various levels of a production network, solving lower levels and passing the solution up to higher levels. The "level" of a node in the network is the maximum distance from the node to a supply.

The supply chain network comprises: at least one supply chain entity, each supply chain entity producing at least one product, using at least one material operations. The entities can perform material operations to produce the products, based, in part on the solutions obtained by the systems and methods disclosed herein.

In one aspect, a computer-implemented method includes: constructing, by a processor, a representation of a Mixed Integer Programming (MIP) problem by defining nodes and arcs that are parametrized independent of input data; generating, by the processor, one or more flow nodes, one or more production nodes and one or more arcs in a production network model for specific instances of the MIP problem by mapping the input data to parameters, each production node incorporating variables that are in three or more constraints, with the production network model incorporating one or more directionality bits; and determining, by the processor, a solution to the representation of the MIP problem based on feasible flows on the arcs in conjunction with a parametrized multi-level search heuristic.

Input into the parametrized multi-level search heuristic can comprise: a sequence of demands; a percentage of each demand to be satisfied in each pass; and a warm start solution.

In the computer-implemented method, the arcs may be sorted first by their respective flow quantities in the warm start solution, and second, by linear relaxation.

In the computer-implemented method, the parametrized multi-level search heuristic may include bottom-up dynamic programming.

In the computer-implemented method, the three or more constraints may each be annotated with a category; and a directionality of each constraint within the category may be inferred. Other technical features may be readily apparent to one skilled in the art from the following figures, descriptions, and claims.

In one aspect, a computing apparatus includes a processor. The computing apparatus also includes a memory storing instructions that, when executed by the processor, configure the apparatus to: construct, by the processor, a representation of a Mixed Integer Programming (MIP) problem by defining nodes and arcs that are parametrized independent of input data; generate, by the processor, one or more flow nodes, one or more production nodes and one or more arcs in a production network model for specific instances of the MIP problem by mapping the input data to parameters, each production node incorporating variables that are in three or more constraints, with the production network model incorporating one or more directionality bits; and determine, by the processor, a solution to the representation of the MIP problem based on feasible flows on the arcs in conjunction with a parametrized multi-level search heuristic.

In the computing apparatus, input into the parametrized multi-level search heuristic may include: a sequence of demands; a percentage of each demand to be satisfied in each pass; and a warm start solution.

In the computing apparatus, the three or more constraints may each be annotated with a category; and a directionality of each constraint within the category may be inferred. Other technical features may be readily apparent to one skilled in the art from the following figures, descriptions, and claims.

In the computing apparatus, the arcs may be sorted first by their respective flow quantities in the warm start solution, and second, by linear relaxation.

In the computing apparatus, the parametrized multi-level search heuristic may include bottom-up dynamic programming.

In one aspect, a non-transitory computer-readable storage medium is provided, the computer-readable storage medium including instructions that when executed by a computer, cause the computer to: construct, by a processor, a representation of a Mixed Integer Programming (MIP) problem by defining nodes and arcs that are parametrized independent of input data; generate, by the processor, one or more flow nodes, one or more production nodes and one or more arcs in a production network model for specific instances of the MIP problem by mapping the input data to parameters, each production node incorporating variables that are in three or more constraints, with the production network model incorporating one or more directionality bits; and determine, by the processor, a solution to the representation of the MIP problem based on feasible flows on the arcs in conjunction with a parametrized multi-level search heuristic.

In the computer-readable storage medium, input into the parametrized multi-level search heuristic may include: a sequence of demands; a percentage of each demand to be satisfied in each pass; and a warm start solution.

In the computer-readable storage medium, the three or more constraints may each be annotated with a category; and a directionality of each constraint within the category may be inferred. Other technical features may be readily apparent to one skilled in the art from the following figures, descriptions, and claims.

In the computer-readable storage medium, the arcs may be sorted first by their respective flow quantities in the warm start solution, and second, by linear relaxation.

In the computer-readable storage medium, the parametrized multi-level search heuristic may include bottom-up dynamic programming. Other technical features may be readily apparent to one skilled in the art from the following figures, descriptions, and claims.

The details of one or more embodiments of the subject matter of this specification are set forth in the accompanying drawings and the description below. Other features, aspects, and advantages of the subject matter will become apparent from the description, the drawings, and the claims.

Other technical features may be readily apparent to one skilled in the art from the following figures, descriptions, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 15 illustrates a comparison of run times in accordance with one embodiment.

DETAILED DESCRIPTION

Figure 1:
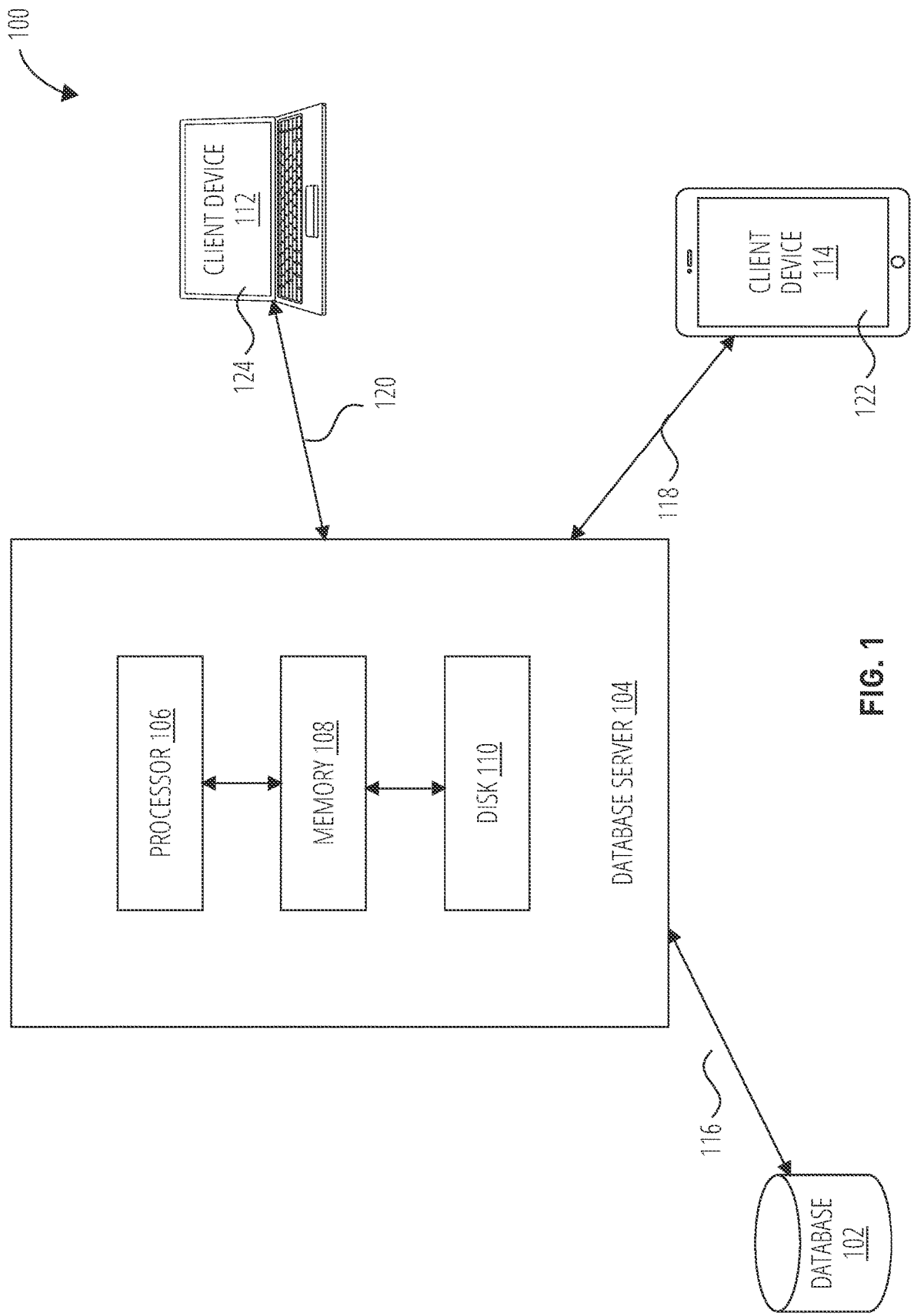
FIG. 1 illustrates an example of a system in accordance with one embodiment.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled as modules, in order to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium can include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

A computer program (which may also be referred to or described as a software application, code, a program, a script, software, a module or a software module) can be written in any form of programming language. This includes compiled or interpreted languages, or declarative or procedural languages. A computer program can be deployed in many forms, including as a module, a subroutine, a stand-alone program, a component, or other unit suitable for use in a computing environment. A computer program can be deployed to be executed on one computer or can be deployed on multiple computers that are located at one site or distributed across multiple sites and interconnected by a communication network.

As used herein, a "software engine" or an "engine," refers to a software implemented system that provides an output that is different from the input. An engine can be an encoded block of functionality, such as a platform, a library, an object or a software development kit ("SDK"). Each engine can be implemented on any type of computing device that includes one or more processors and computer readable media. Furthermore, two or more of the engines may be implemented on the same computing device, or on different computing devices. Non-limiting examples of a computing device include tablet computers, servers, laptop or desktop computers, music players, mobile phones, e-book readers, notebook computers, PDAs, smart phones, or other stationary or portable devices.

The processes and logic flows described herein can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows that can be performed by an apparatus, can also be implemented as a graphics processing unit (GPU).

Computers suitable for the execution of a computer program include, by way of example, general or special purpose microprocessors or both, or any other kind of central processing unit. Generally, a central processing unit receives instructions and data from a read-only memory or a random access memory or both. A computer can also include, or be operatively coupled to receive data from, or transfer data to, or both, one or more mass storage devices for storing data, e.g., optical disks, magnetic, or magneto optical disks. It should be noted that a computer does not require these devices. Furthermore, a computer can be embedded in another device. Non-limiting examples of the latter include a game console, a mobile telephone a mobile audio player, a personal digital assistant (PDA), a video player, a Global Positioning System (GPS) receiver, or a portable storage device. A non-limiting example of a storage device include a universal serial bus (USB) flash drive.

Computer readable media suitable for storing computer program instructions and data include all forms of non-volatile memory, media and memory devices; non-limiting examples include magneto optical disks; semiconductor memory devices (e.g., EPROM, EEPROM, and flash memory devices); CD ROM disks; magnetic disks (e.g., internal hard disks or removable disks); and DVD-ROM disks. The processor and the memory can be supplemented by, or incorporated in, special purpose logic circuitry.

To provide for interaction with a user, embodiments of the subject matter described herein can be implemented on a computer having a display device for displaying information to the user and input devices by which the user can provide input to the computer (for example, a keyboard, a pointing device such as a mouse or a trackball, etc.). Other kinds of devices can be used to provide for interaction with a user. Feedback provided to the user can include sensory feedback (e.g., visual feedback, auditory feedback, or tactile feedback). Input from the user can be received in any form, including acoustic, speech, or tactile input. Furthermore, there can be interaction between a user and a computer by way of exchange of documents between the computer and a device used by the user. As an example, a computer can send web pages to a web browser on a user's client device in response to requests received from the web browser.

Embodiments of the subject matter described in this specification can be implemented in a computing system that includes: a front end component (e.g., a client computer having a graphical user interface or a Web browser through which a user can interact with an implementation of the subject matter described herein); or a middleware component (e.g., an application server); or a back end component (e.g. a data server); or any combination of one or more such back end, middleware, or front end components. The components of the system can be interconnected by any form or medium of digital data communication, e.g., a communication network. Non-limiting examples of communication networks include a local area network ("LAN") and a wide area network ("WAN").

The computing system can include clients and servers. A client and server are generally remote from each other and typically interact through a communication network. The relationship of client and server arises by virtue of computer programs running on the respective computers and having a client-server relationship to each other.

FIG. 1 illustrates an example of a system 100 in accordance with an embodiment.

System 100 includes a database server 104, a database 102, and client devices 112 and 114. Database server 104 can include a memory 108, a disk 110, and one or more processors 106. In some embodiments, memory 108 can be volatile memory, compared with disk 110 which can be non-volatile memory. In some embodiments, database server 104 can communicate with database 102 using interface 116. Database 102 can be a versioned database or a database that does not support versioning. While database 102 is illustrated as separate from database server 104, database 102 can also be integrated into database server 104, either as a separate component within database server 104, or as part of at least one of memory 108 and disk 110. A versioned database can refer to a database which provides numerous complete delta-based copies of an entire database. Each complete database copy represents a version. Versioned databases can be used for numerous purposes, including simulation and collaborative decision-making.

System 100 can also include additional features and/or functionality. For example, system 100 can also include additional storage (removable and/or non-removable) including, but not limited to, magnetic or optical disks or tape. Such additional storage is illustrated in FIG. 1 by memory 108 and disk 110. Storage media can include volatile and nonvolatile, removable and non-removable media implemented in any method or technology for storage of information such as computer-readable instructions, data structures, program modules or other data. Memory 108 and disk 110 are examples of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 100. Any such non-transitory computer-readable storage media can be part of system 100.

System 100 can also include interfaces 116, 118 and 120. Interfaces 116, 118 and 120 can allow components of system 100 to communicate with each other and with other devices. For example, database server 104 can communicate with database 102 using interface 116. Database server 104 can also communicate with client devices 112 and 114 via interfaces 120 and 118, respectively. Client devices 112 and 114 can be different types of client devices; for example, client device 112 can be a desktop or laptop, whereas client device 114 can be a mobile device such as a smartphone or tablet with a smaller display. Non-limiting example interfaces 116, 118 and 120 can include wired communication links such as a wired network or direct-wired connection, and wireless communication links such as cellular, radio frequency (RF), infrared and/or other wireless communication links. Interfaces 116, 118 and 120 can allow database server 104 to communicate with client devices 112 and 114 over various network types. Non-limiting example network types can include Fibre Channel, small computer system interface (SCSI), Bluetooth, Ethernet, Wi-fi, Infrared Data Association (IrDA), Local area networks (LAN), Wireless Local area networks (WLAN), wide area networks (WAN) such as the Internet, serial, and universal serial bus (USB). The various network types to which interfaces 116, 118 and 120 can connect can run a plurality of network protocols including, but not limited to Transmission Control Protocol (TCP), Internet Protocol (IP), real-time transport protocol (RTP), realtime transport control protocol (RTCP), file transfer protocol (FTP), and hypertext transfer protocol (HTTP).

Using interface 116, database server 104 can retrieve data from database 102. The retrieved data can be saved in disk 110 or memory 108. In some cases, database server 104 can also comprise a web server, and can format resources into a format suitable to be displayed on a web browser. Database server 104 can then send requested data to client devices 112 and 114 via interfaces 120 and 118, respectively, to be displayed on applications 122 and 124. Applications 122 and 124 can be a web browser or other application running on client devices 112 and 114.

Figure 2:
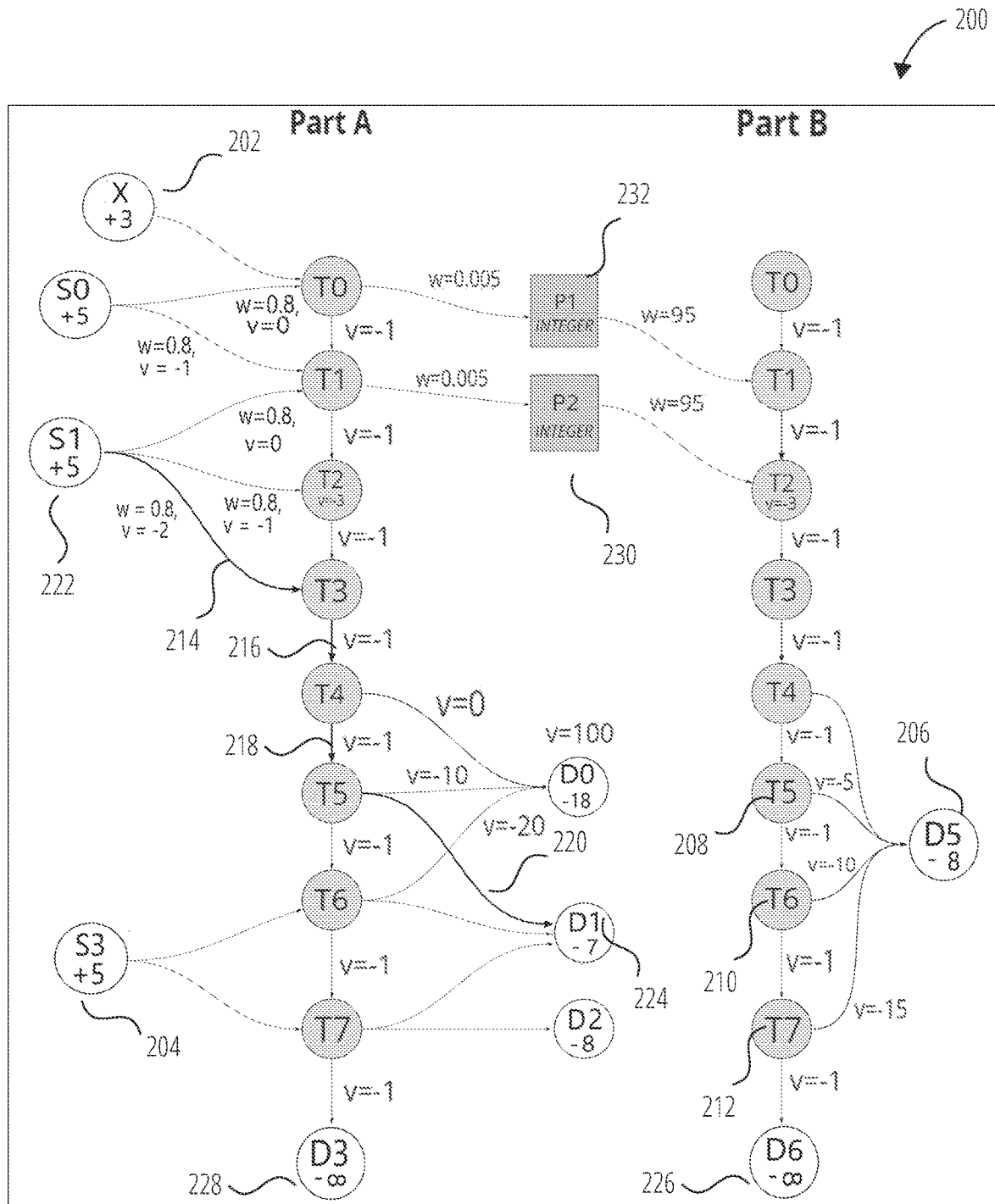
FIG. 2 illustrates a network representation.

FIG. 2 illustrates a network representation 200 that represents a simple problem of balancing supply and demand of two parts (part 'A' and part 'B') over a 7-day horizon. The network representation 200 describes the way in which supply can flow or be transformed throughout the network. In the example network representation 200, a shipment has a yield of 0.9 and can be delivered a day late to node T1 at a cost of −1 value per unit. That is FIG. 2 is a network model representation of a supply chain problem.

The nodes shown in FIG. 2 are as follows:
  'S' nodes—Supply node. These are the inputs to the network—such as shipments received, or inventory that is available at the start of the planning horizon.
  'X' nodes—Supply (On Hand) node. These are input to the network and represent the number of units available in inventory at the start of the planning horizon.
  'D' nodes—Demand node. These are the outputs to the network. The infinite demand nodes 228 and 226 represent the amount of inventory carried at the end of the planning horizon. That is, excess supply needs somewhere to go. As such, each infinite demand node represents final inventory held at the end of the planning horizon.

'T' nodes—Flow nodes These nodes represent standard mathematical nodes, with the standard flow constraint—sum of all in-flow equals the sum of all outflow.

Square 'P' nodes—Production node. This is a node that has non-standard properties. It requires all arcs to the same amount of flow in and out of the 'P' node, and represents the concept of a "proportional flow constraint" as defined in academic literature. It can also have integral flow, be semi-continuous, or any other non-linear flow domain.

Quantities marked "+/−" on supply or demand nodes represents the amount of supply or the amount of demand. As an example, at 204, supply node S3 has a surplus of 5 units, while at 206, demand node D5 has a deficit of 8 units. Furthermore, at 202, node X represents 3 units of Oh Hand, which is the number of units of Part A available in inventory at the start of the planning horizon.

Also, regarding the arcs (that is, connection between the various nodes):

The designation "w=" represents the weight of the arc. Flow along an arc is scaled by its weight; the flow_out=(weight)×(flow_in).

The designation "v=" represents the value of the arc. In the example network representation 200, a shipment has a yield of 0.9 and can be delivered a day late to node T1 at a cost of value=−1, per unit. This is used by the optimization algorithms to assign a value to solutions. The goal of most processes is to maximize the value. As can be seen in FIG. 2, the cost of carrying inventory is v=−1, per unit, per day, in the series of arrows from node T0, to node T1, to node T2, to node T3, to node T4, to node T5, to node T6, to node T7, and so on. Furthermore, the flow from node T5 (208) is a day late and penalized at v=−10, per unit. Furthermore, being late to satisfy the demand at node D5 (206) is penalized by subtracting a value of 5 (i.e. v=−5) from each unit per day late. That is, for the arc from node T5 (208) to node D5 (206) has v=−5. One day later, the arc from node T6 (210) to node D5 (206) has v=−10. Finally, yet another day later, the arc from node T7 (212) to node D5 (206) has v=−15.

The bold arcs (214, 216, 218, 220) represent the cheapest way from supply node S1 (222) to satisfy demand from node D1 (224). In this example, the path is showing that the cheapest way to satisfy the 3 units of demand for the D1 node is to use pull it from the S1 supply node. This path is from S1 to T3, T3 to T4, T4 to T5, T5 to D1

The P2 production node 230 demonstrates how integrality and arc weights can be used to model batches and yields. This node has an integrality constraint that represent production in batches, so it consumes 200 input units per batch, and produces 95 output units. This is encoded in the weights. The weight on the input arc is 0.005, which means that 200 units of flow on the arc is scaled into 200×0.005=1 unit of flow coming out of the arc. This single unit of flow is put into the output arc which results in 1×95=95 units of output. The same applies to P1 production node 232.

Figure 3:
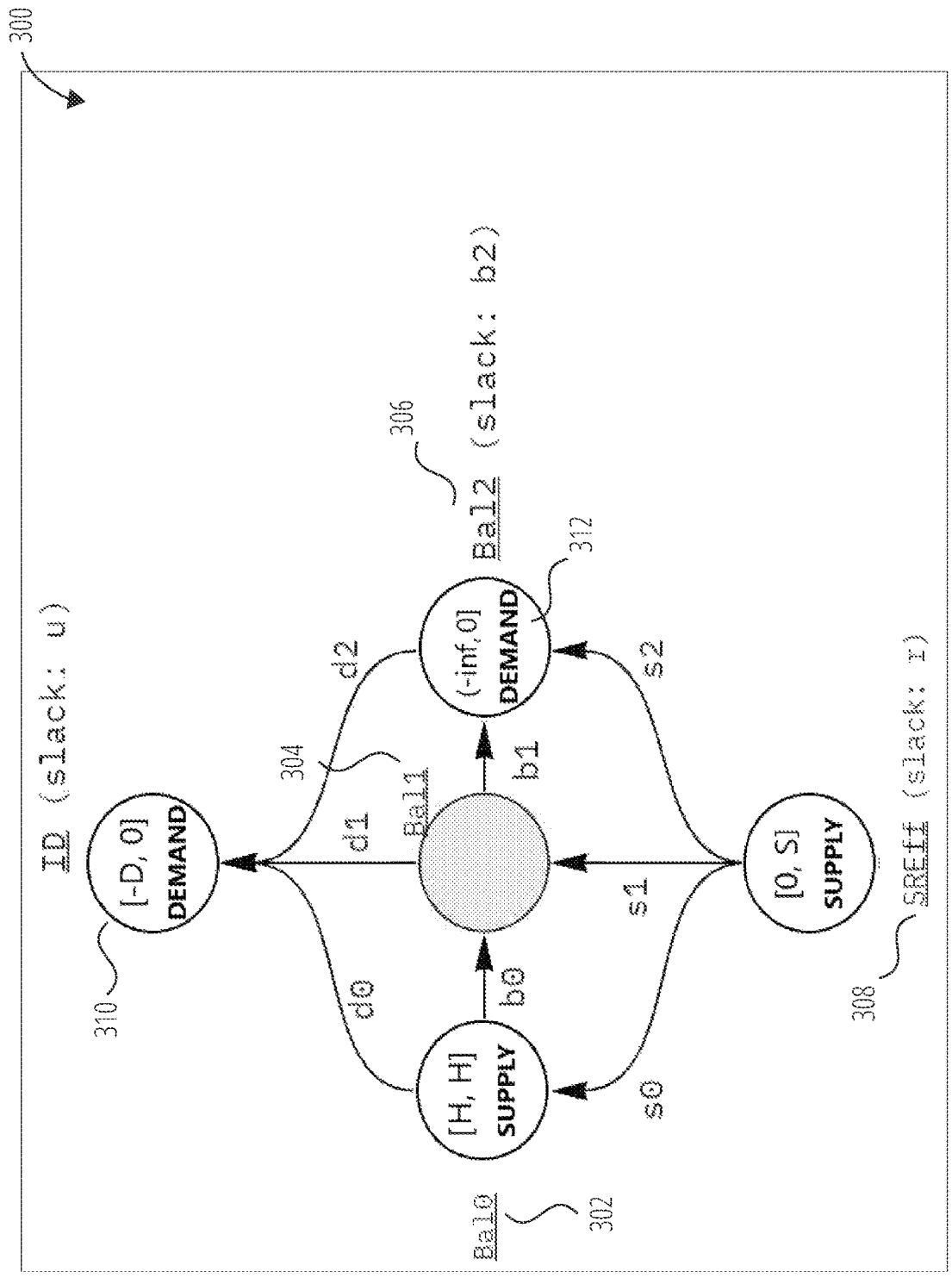
FIG. 3 illustrates a network representation.

FIG. 3 illustrates a network representation 300 of an MIP model, in which variables (of the MIP model) are converted into arcs, and constraints (of the MIP model) are converted into nodes. It follows that a constraint range is converted into a range for the corresponding node.

The "net flow" of each node in FIG. 3 is the total outflow from the node minus the total inflow into the node. Node labels represent the range of feasible net flows. In the example shown in FIG. 3, the feasibility at each node is defined as flow output minus flow input at each node throughout the entire diagram. This is an arbitrary convention that can be reversed throughout the entire diagram.

While FIG. 2 is a network representation of a complex supply chain problem, FIG. 3 is a network representation of an MIP model of a relatively simple supply chain problem in which there is inventory at the start of the chain, one shipment that can be received, and one demand to satisfy. Inventory carried at the end of the planning horizon is represented by 312 in network representation 300.

Now consider the following standard steps that can be used for converting an MIP model into a network representation (an example of which is shown in FIG. 3):

Step 1A: For each node create a constraint. Upper/Lower bounds of the constraint are the bounds on the net flow of the node.

Step 2A: If the net flow bounds of the node are an inequality rather than an equality, introduce an always-positive slack variable with an objective weight equal to the objective weight of the node.

Step 3A: For each arc, create a new variable. Give this variable a coefficient of −1 at its source node, and +1 at its destination node.

Application of the steps 1A-3A to an MIP model can result in the network representation 300, which differs only in the signs of the coefficients of a Scheduled Receipt Effective Value ("SREff") constraint. A "Scheduled Receipt Effective Value" is the quantity received from a shipment or process.

Notation in FIG. 3 is as follows: Bal0, Bal1, Bal2 refer to the balance at day 0, day 1 and day 2 respectively, while b0 and b1 represent the inventory carried from day 0 to day 1, and day 1 to day 2, respectively. Furthermore, s0, s1, and s2 represent supply (or shipment) on day 0, day 1 and day 2, respectively. Similarly, d0, d1, and d2 represent demand satisfied on day 0, day 1 and day 2, respectively.

In addition, there are variables in the MIP, which have no corresponding arc. These include a slack variable 'r" in the SREff, a slack variable 'u' in the Independent Demand, and a slack variable 'b' in Bal2 (Balance on day 2). There is no slack variable at Bal0 node 302—only a fixed number of 'H' units of supply that is to be carried forward onto future days, or to be used to satisfied demand.

Figure 4:
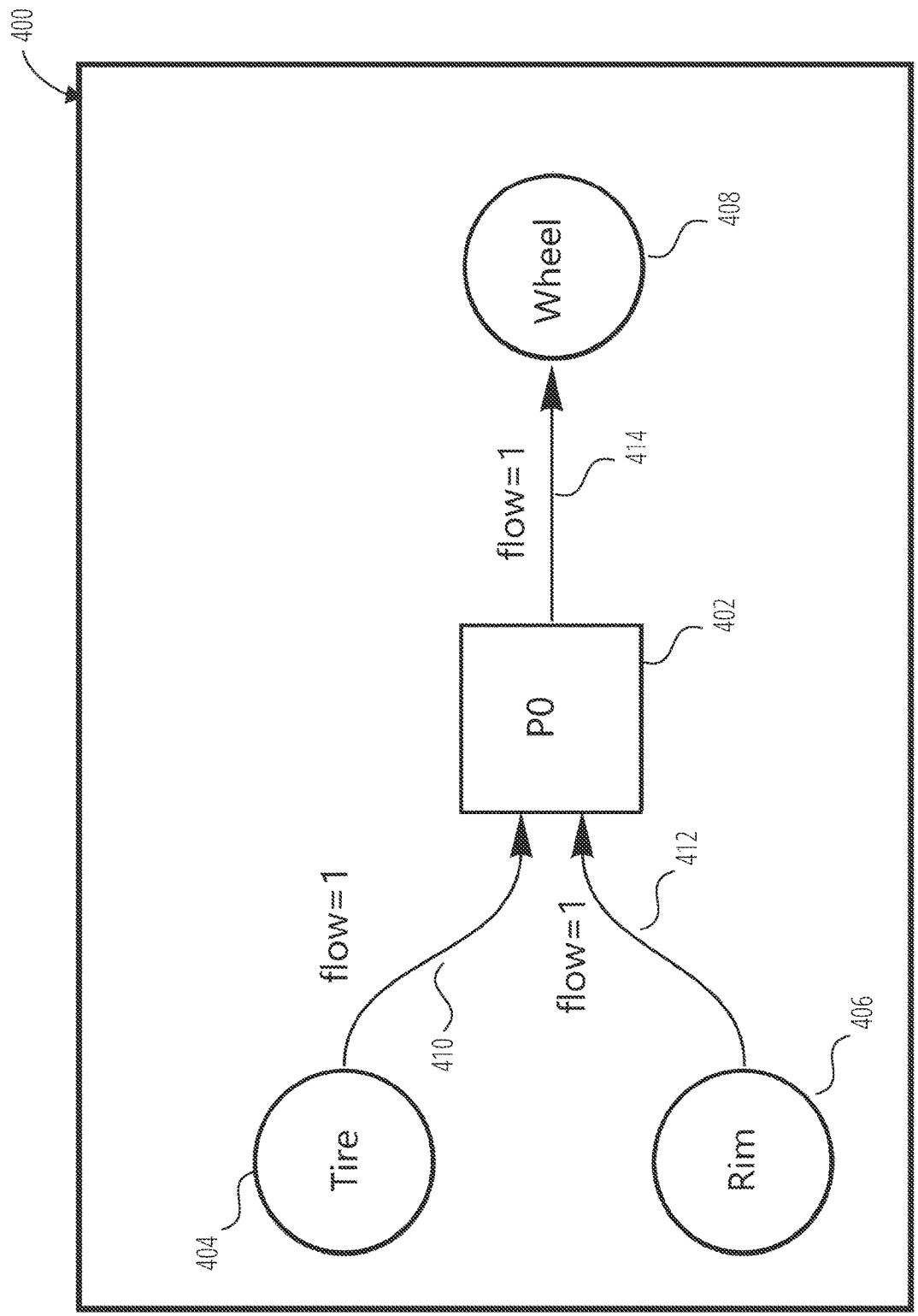
FIG. 4 illustrates a production node in accordance with one embodiment.

The constraints at each node, based on FIG. 3, are as follows, with the convention that output flow is negative, while input flow is positive:

At Bal0 node 302: −b0+s0−d0=−H
At Bal1 node 304: +b0−b1+s1−d1=0
At Bal2 node 306: +b1−b2+s2−d2=0
At SREff node 308: −s0−s1−s2−r=−S
At ID node 310: +d0+d1+d2+u=D FIG. 4 illustrates a production network model 400 in accordance with one embodiment.

This model represents production of a wheel by consuming a tire and a rim. In FIG. 4, production node P0 402 consumes flow from all input arcs uniformly. A tire flows from tire node 404, and a rim flows from rim node 406 into production node P0 402, while one wheel flows out at wheel node 408.

Production network model 400 introduces production node P0 402 in which two different types of flows (410, 412) are combined to make a new type of flow (414). This is distinct from the nodes shown in FIG. 3, in which the sum of flows entering a node equals the sum of flows exiting that node. Standard network representations do not allow for the transformation of flows. The production network model 400 introduces, for the first time, the transformation of flows (via production node P0 402), and allows for analysis of complexity that was previously unavailable via standard network representation models. In addition, a production can capture complexities such as nonlinearity; integer or semi-continuous or other types of constraints on the domain of the variable may be captured in this these nodes.

As an example, while such complexities of transformation can be introduced into an MIP model, the subsequent MIP model cannot be transformed into a standard network model as outlined above in steps 1A-3A.

The path between each item node (i.e. Tire node 404, rim node 406 and wheel node 408) and production node P0 402 is symbolized by an arc; each arc has a direction (either into, or out of, production node P0 402) and a flow value. The flow value indicates the number of items flowing in the arc.

Arc 410 is directed from tire node 404 to production node P0 402, and has a flow value of 1 (meaning that 1 tire flows from tire node 404 to production node P0 402).

Arc 412 is directed from rim node 406 to production node P0 402, and has a flow value of 1 (meaning that 1 rim flows from rim node 406 to production node P0 402).

Arc 414 is directed from production node P0 402 to wheel node 408, and has a flow value of 1 (meaning that 1 wheel flows from production node P0 402 to wheel node 408).

Let p0 be the variable representing the production quantity:
  Bal0_wheel: $-p0=0$
  Bal0_Frame: $-p0=0$
  Bal1_Bicycle: $+p0=0$ The problem can be framed as a unit of production p0 taking a unit from the two component balance constraints, and producing a unit into an assembly balance constraint.

The previous algorithm can be easily adopted once the constraints are "normalized" so that the respective signs of the coefficients represent the direction of flow. In the case where there is a variable which is in two or more constraints and cannot be interpreted as a normal arc, a new production node is created and an arc is added for each constraint the production variable has a non-zero coefficient in. The direction of the arc is determined by the sign of the coefficient.

This representation allows for use of a number of network algorithms, such as topological sort, graph colouring, cutting sets, and cycle detection. A number of other algorithms can also be reasonably adapted.

Figure 5:
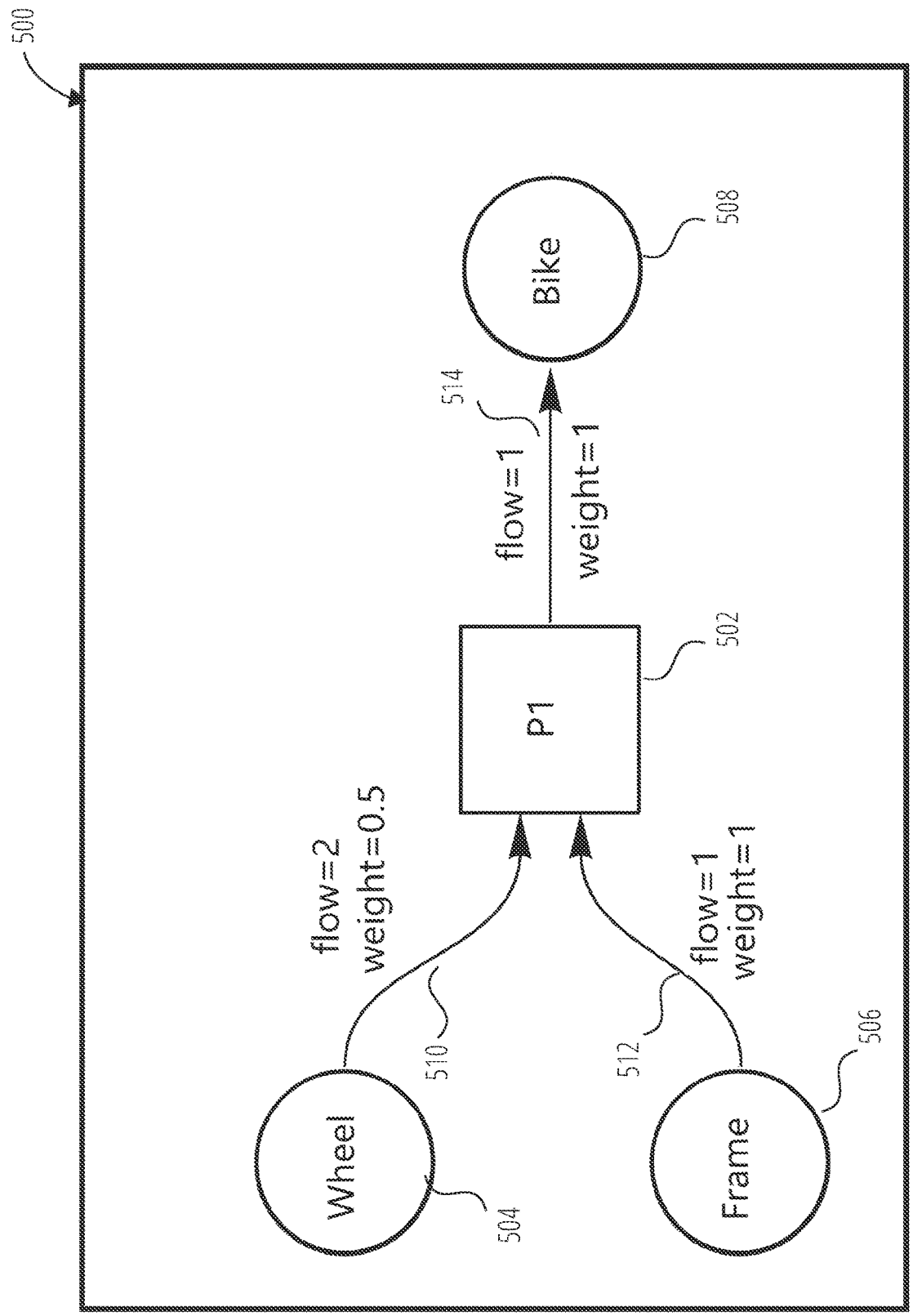
FIG. 5 illustrates a production node in accordance with one embodiment.

There is also an option to introduce weights in the network representation. For example, assembling a bicycle may require consuming two wheels and one frame to produce a single bicycle. The matrix representation can be as follows:
  Bal0_Wheel: $-2\ p0=0$
  Bal0_Frame: $-p0=0$
  Bal1_Bike: $+p0=0$ FIG. 5 illustrates a production network model 500 of the above matrix. This model represents production of a bicycle by consuming two wheels and a frame. The arc weight in a network model is that the outflow of an arc is equal to the inflow times the weight. Therefore, for an inflow arc to a production node, the weight of the arc is the reciprocal of the coefficient in the matrix.

In FIG. 5, production node P1 502 consumes flow from all input arcs uniformly. Two wheels flow from wheel node 504, and one frame flows from frame node 506, into production node P1 502, and one bicycle flows out at bicycle node 508. That is, a bike is produced by consuming two wheels and a frame.

The path between each item node (i.e. wheel node 504, frame node 506 and bicycle node 508) and production node P1 502 is symbolized by an arc; each arc has a direction (either into, or out of, production node P1 502), a flow value, and a weight. The flow value indicates the number of items flowing in the arc.

Arc 510 is directed from wheel node 504 to production node P1 502, and has a flow value of 2 (meaning that 2 wheels flow from wheel node 504 to production node P1 502), and a weight of 0.5 (which is the reciprocal of the coefficient '2').

Arc 512 is directed from frame node 506 to production node P1 502, and has a flow value of 1 (meaning that 1 frame flows from frame node 506 to production node P1 502), and a weight of 1.

Arc 514 is directed from production node P1 502 to bicycle node 508, and has a flow value of 1 (meaning that 1 bicycle flows from production node P1 502 to bicycle node 508), and a weight of 1. The weight of out arcs is the coefficient directly.

The flow coming out of an arc is equal to the flow coming into the arc multiplied by the weight of the arc. For arc 510, the flow coming out is equal to the flow in ($=2$) multiplied by the weight of arc 510 ($=0.5$), which equals to a total outgoing flow of $2\times0.5=1$. For arc 512, the flow coming out is equal to the flow in ($=1$) multiplied by the weight of arc 512 ($=1$), which equals to a total outgoing flow of $1\times1=1$. For arc 514, the flow coming out is equal to the flow in ($=1$) multiplied by the weight of arc 514 ($=1$), which equals to a total outgoing flow of $1\times1=1$.

Similarly, production nodes can be formatted to a non-continuous domain such as: an integer, semi-integer, or binary. The embodiment shown in FIG. 5, can be modified such that the production is an integer variable with a batch size of 10. Then the constraint structure can be as follows:
  Bal0_Wheel: $-20\ p0=0$
  Bal0_Frame: $-10\ p0=0$
  Bal1_Bike: $+10\ p0=0$ The corresponding production network model 600 is illustrated in FIG. 6.

This model represents production of a bicycle by consuming two wheels and a frame. This model demonstrates an integer production node (production node P3 602). Since production node P3 602 has integer flow, it produces bicycles in multiples of 10, and consumes wheels in multiples of 20.

Figure 6:
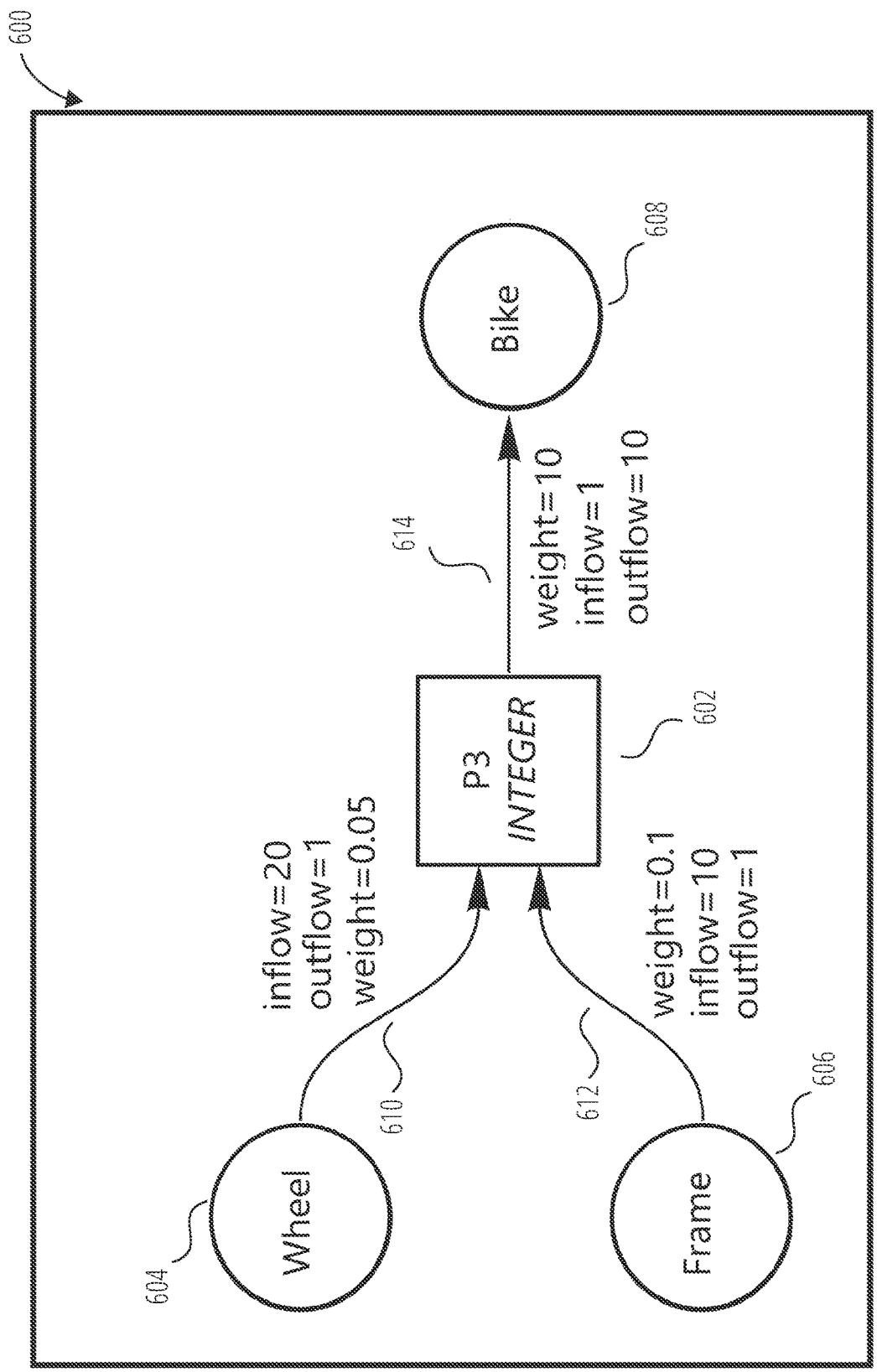
FIG. 6 illustrates a production node in accordance with one embodiment.

In FIG. 6, arc 610 is directed from wheel node 604 to production node P1 production node P3 602, and has an inflow value of 20 (meaning that 20 wheels flow from wheel node 604 to production node P3 802), and a weight of 0.01. The flow coming out of an arc is equal to the flow coming into the arc multiplied by the weight of the arc. For arc 610, the flow coming out is equal to the flow in ($=20$) multiplied by the weight of arc 610 ($=0.05$), which equals to an outflow of $20\times0.05=1$.

Arc 612 is directed from frame node 606 to production node P3 602, and has an inflow value of 10 (meaning that 10 frames flow from frame node 606 to production node P3 602), and a weight of 0.1. The flow coming out of an arc is equal to the flow coming into the arc multiplied by the weight of the arc. For arc 612, the flow coming out is equal to the flow in ($=10$) multiplied by the weight of arc 610 ($=0.1$), which equals to an outflow of $10\times0.1=1$.

Arc 614 is directed from production node P3 602 to bike node 608, and has an inflow value of 1, and a weight of 10. The flow coming out of an arc is equal to the flow coming into the arc multiplied by the weight of the arc. For arc 614, the flow coming out is equal to the flow in ($=1$) multiplied by the weight of arc 614 ($=10$), which equals to a total outgoing flow of $1\times10=10$.

Figure 7:
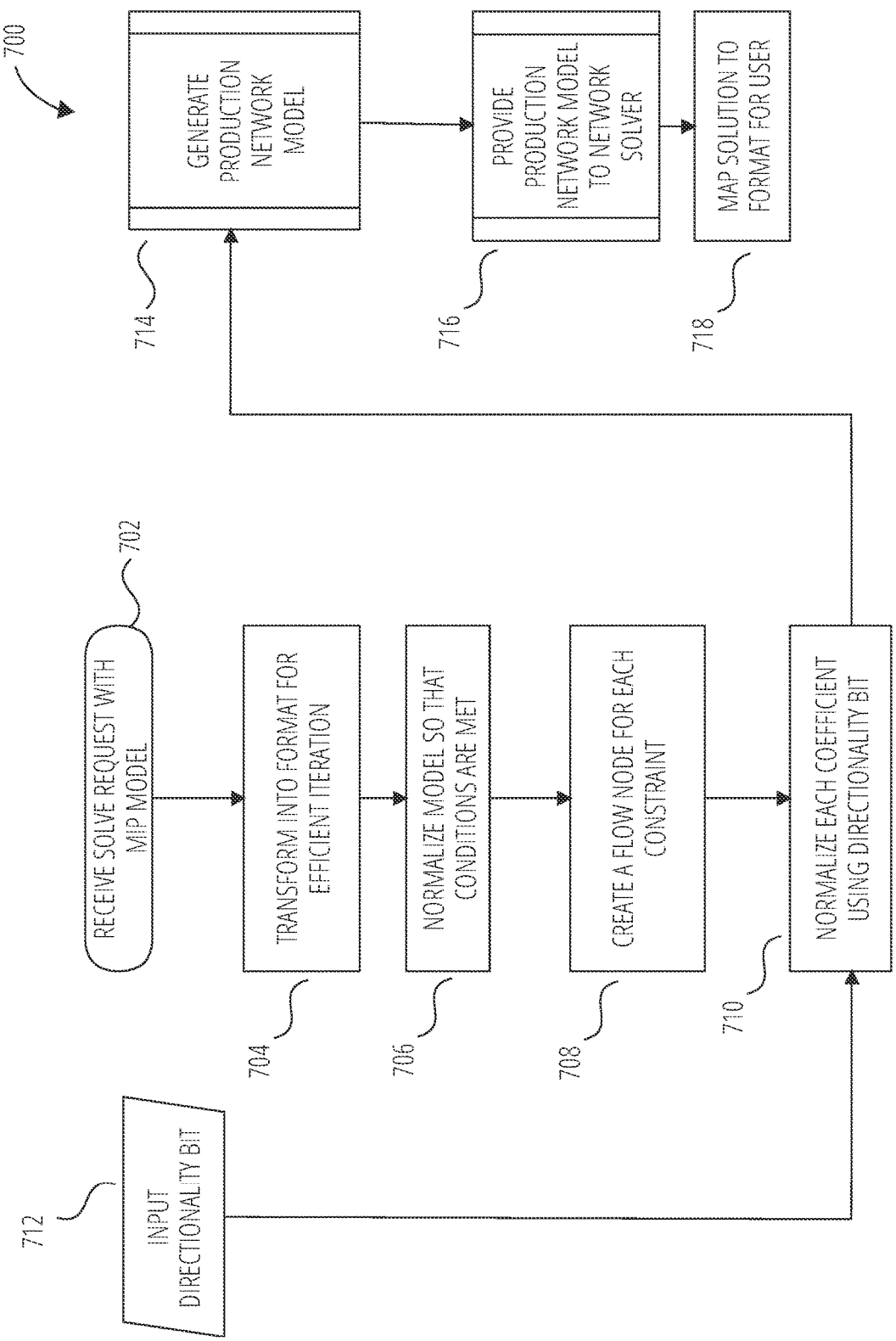
FIG. 7 illustrates a block diagram in accordance with one embodiment.

FIG. 7 illustrates a block diagram 700 in accordance with one embodiment. Block diagram 700 illustrates steps to transform a mixed integer program representation into a production network model.

At 702, a solve request is received, along with an input of an MIP model. Each solve request contains a directionality bit for all constraints in the input at 712. An embodiment of a method to generate a directionality bit for all constraints is discussed in FIG. 9 and FIG. 10.

At 704, there is a transformation into a format that can efficiently iterate the constraints for a variable, and efficiently iterate the variables for a constraint. As an example, MIP models can generally be represented by a matrix. For a class of problems, the matrix can be sparse, in that many elements in the matrix are zero. Step 704 allows for efficient access of the elements of a sparse matrix by selecting a dimension (for example, a column), and then selecting the non-zero elements in each row of that column. That is, step 704 allows for efficient access by row and by column of nonzero entries in a sparse matrix.

Subsequently, at 706, the model can be normalized so that the following conditions may be met: i) all variables are non-negative; ii) all constraints are equality relationships; and iii) the right-hand side of every constraint is set to 0. The first two listed conditions are standard normalization techniques, whereas the third condition is novel. With the third condition, the original non-zero right-hand side of each constraint is incorporated directly into the network, as it determines whether an entity is a supply or a demand.

At 708, for every constraint in the normalized model, a flow node is created. At 710, the directionality bit contained in the solve request (at 712) is received, where all of the coefficients are normalized by multiplying each coefficient by the directionality bit (provided by the user) for each constraint. After this step, a variable's coefficient is positive if, and only if, it represents flow into the node associated with its constraint.

At subroutine 714, a production network model is produced: for each variable, nodes and arcs are created to represent the variable in the production network model. Subroutine 714 is further elaborated in FIG. 8. At subroutine 716, the completed production network model is provided a network solver, which provides a solution in a particular format. The network solver comprises the following capabilities: a) a parameterized heuristic that is a generalized version of a Multi-Level Search algorithm in core supply planning algorithms; and b) a suite of meta-heuristics that can be run on top of the general heuristic to improve solution quality. A core supply planning algorithm can be parameterized in the following ways: a) the sequence of demands; b) the percent of each demand to be satisfied each pass; and c) a warm start solution (which does not have to be feasible). The network solver is discussed further in FIG. 11, FIG. 12, FIG. 13, and FIG. 14. The solution is mapped onto a format suitable for a user at 718.

Figure 8:
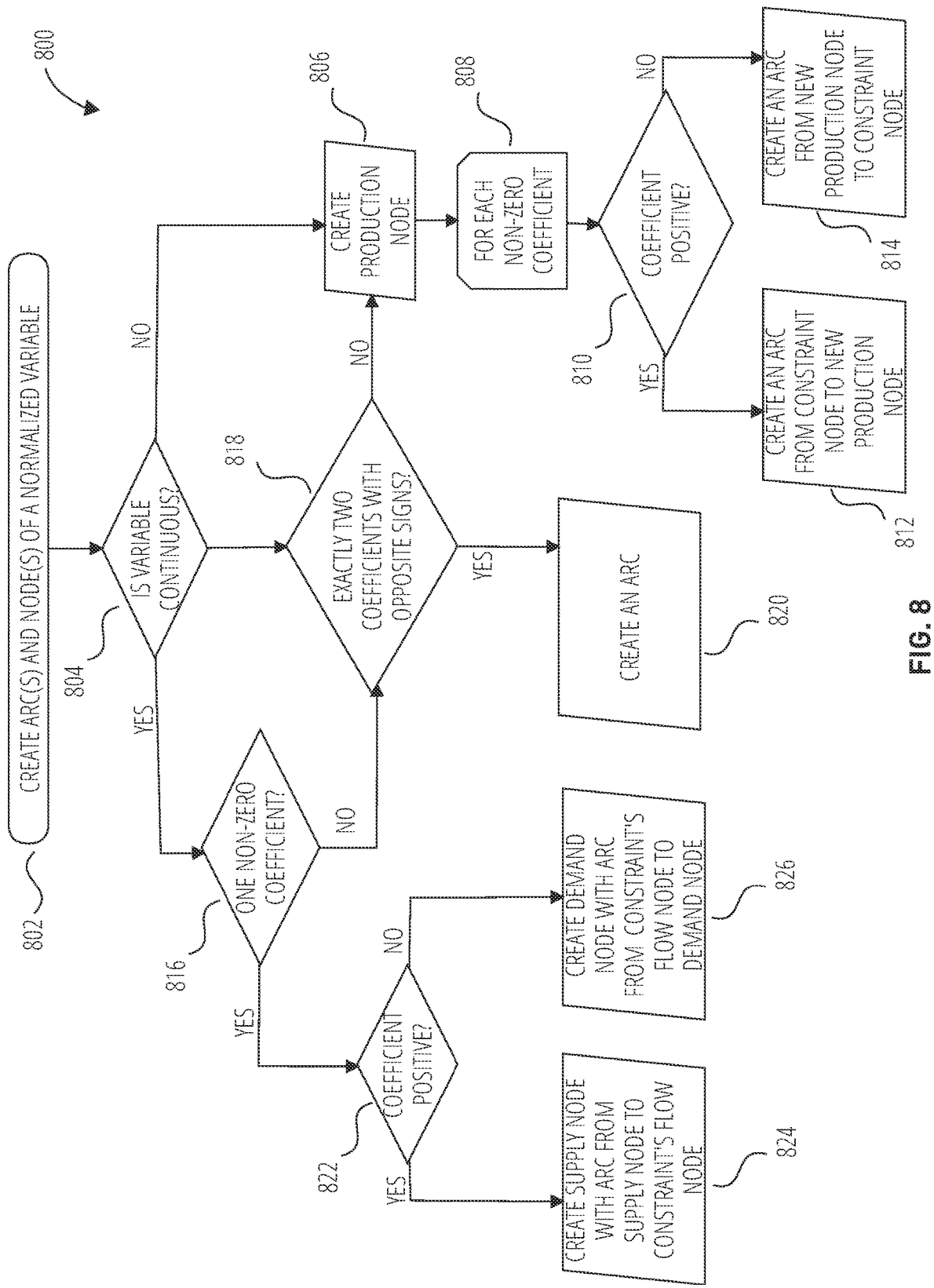
FIG. 8 illustrates a block diagram for creation of nodes and arcs in accordance with one embodiment.

FIG. 8 illustrates a block diagram 800 for creation of a production network model in accordance with one embodiment. Block diagram 800 is in reference to subroutine 714 of FIG. 7. Item 802 indicates creation of arcs and nodes of a given normalized variable.

If the variable is not continuous (decision block 804), then a production node is created for the variable at 806. For each non-zero coefficient of the variable (step 808), the coefficient is checked for positivity (decision block 810). If the coefficient is negative, then at 814, an arc is created, from the new production node to the node of the constraint. If the coefficient is positive, then at 812, an arc is created, from the node of the constraint to the new production node. Thus the outcome of decision block 810 reflects the directionality of the resulting arc.

On the other hand, if the variable is continuous (decision block 804), then the variable is checked to see if has exactly one non-zero coefficient (decision block 816).

If the continuous variable does not have exactly one non-zero coefficient, the variable is checked to see if has exactly two coefficients, with opposite signs (decision block 818). If the continuous variable has exactly two coefficients with opposite signs ('yes' at decision block 818), then an arc is created at 820, such the source node comes from the negative coefficient and the destination node comes from the positive coefficient. If the continuous variable does not have exactly two coefficients with opposite signs ('no' at decision block 818), then a production node is created for the variable at 806. For each non-zero coefficient of the variable (step 808), the coefficient is checked for positivity (decision block 810). If the coefficient is negative, then at 814, an arc is created, from the new production node to the node of the constraint. If the coefficient is positive, then at 812, an arc is created, from the node of the constraint to the new production node.

If the continuous variable has exactly one non-zero coefficient, the coefficient is checked to see if it is positive (decision block 822). If the coefficient is negative, then at 826, a demand node is created, with an arc going from the constraint's flow node to the demand node. If the coefficient is positive, then at 824, a supply node is created, with an arc going from the supply node to the constraint's flow node. Thus the outcome of decision block 822 reflects the directionality of the resulting arc.

Evaluation of a Directionality Bit

Figure 9:
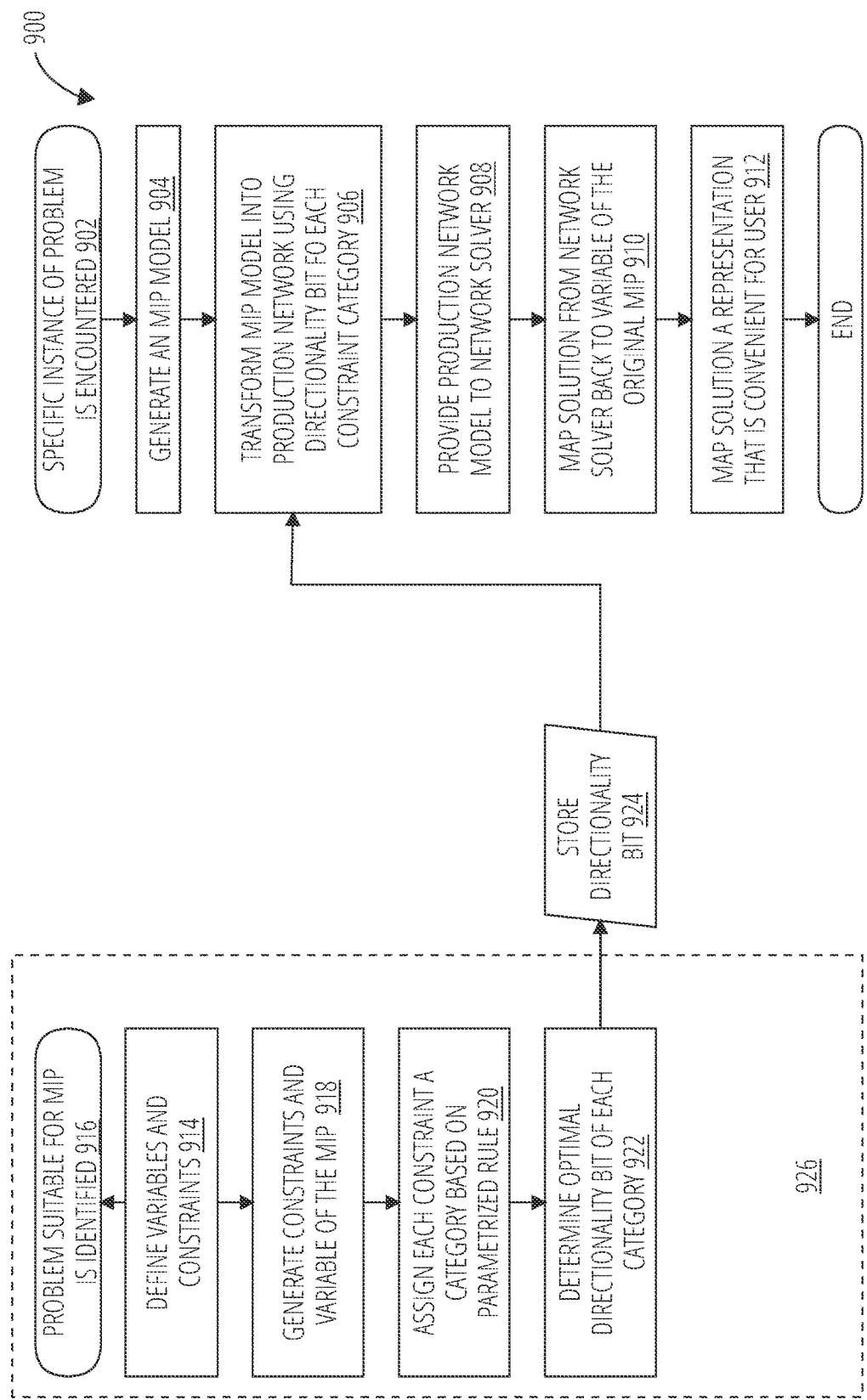
FIG. 9 illustrates an aspect of the subject matter in accordance with one embodiment.

FIG. 9 illustrates a block diagram 900 in accordance with one embodiment.

Block diagram 900 discloses a method that allows a user to develop an MIP model with constraints annotated with a category, that allows for inference of the directionality of all the constraints in a category at once, in a manner that is transparent to the user.

It is a common practice when defining an MIP model, to have a small number of constraint categories which are defined in a parameterized way. When constructing the actual model, actual parameters of the problem at hand can be used to generate a much larger set of constraints. In many situations, the directionality of two constraints can then be the same if each constraint is in the same category.

If there are a small enough number of categories, the directionality of the categories can easily be calculated by using a brute force approach of trying all the options and remembering each result. This approach may not have to be run frequently, and when new constraint categories are added, the previous result can be built upon, such that a brute force approach is applied only to the set of new constraint categories.

For example, when modelling 30 days of inventory balance of a warehouse with 100 different products, there can be three different constraint types:

Balance constraints: The stored quantity of a product at the start of the day is equal to the ending quantity of the previous day.

Incoming Truck Constraints: The total weight of product being unloaded from a truck does not exceed the trucks capacity.

Outgoing Demand Constraint: The quantity of a product being shipped to a customer does not exceed the amount that they asked for.

The first of these categories, the balance constraints, will result in 3000 actual constraints being created when the model is generated for 30 days of balance with 100 different products. However since each of these constraints represents the same type of flow, they will all have the same directionality value. In this example, since there are only 3 categories of constraints, a brute force approach can be used with respect to directionality by only trying 8 different combinations.

The portion 926 of block diagram 900 illustrates how to determine a directionality bit (within an MIP model) that can be used in step 712 of FIG. 7. Block diagram 900 further illustrates how constraint categories can be used to solve a problem using a production network solver with minimal impact on an existing process.

In FIG. 9, at block 914, a representation of MIP can be constructed by defining variables and constraints that are parametrized to be independent of the data. Next, at block 918, constraints and variables of the MIP are generated for specific instances of the problem, by mapping input data to the parameters. At block 920, every time the method creates a constraint, it assigns the constraint a category based on which parametrized rule was applied to generate the constraint. Next, at block 922, an example instance of the problem is used to calculate the directionality bit of each category, which is then used in FIG. 7, to transform the MIP model into a production network.

In FIG. 9, a problem that is suitable for optimization using MIP is identified at 916. Next, at block 914, a representation of the problem is constructed by defining variables and constraints that are parametrized to be independent of the data. A computer-implemented method generates the constraints and variables of a MIP for specific instances of the problem, at block 918, by mapping input data to the parameters.

At block 920, every time the method creates a constraint, it assigns the constraint a category based on which parametrized rule was applied to generate the constraint. Next, at block 922, an example instance of the problem is used to calculate the optimal directionality bit of each category. The optimal directionality bit of each category is then stored in an accessible location at 924.

Meanwhile, at 902, a specific instance of the problem is encountered, after which, the method is used on the instance data to generate a MIP model at block 904. The MIP model is then translated in a production network using the previously calculated directionality bit for each constraint category at block 906.

The Production Network model is provided to a network solver at block 908, which calculates the solution by determining feasible flows on all of the arcs. The solution is then mapped from the network back to the variables of the original MIP at block 910. The solution is mapped to a representation that is convenient for the user of the solution at block 912, after which point, the procedure ends.

Figure 10:
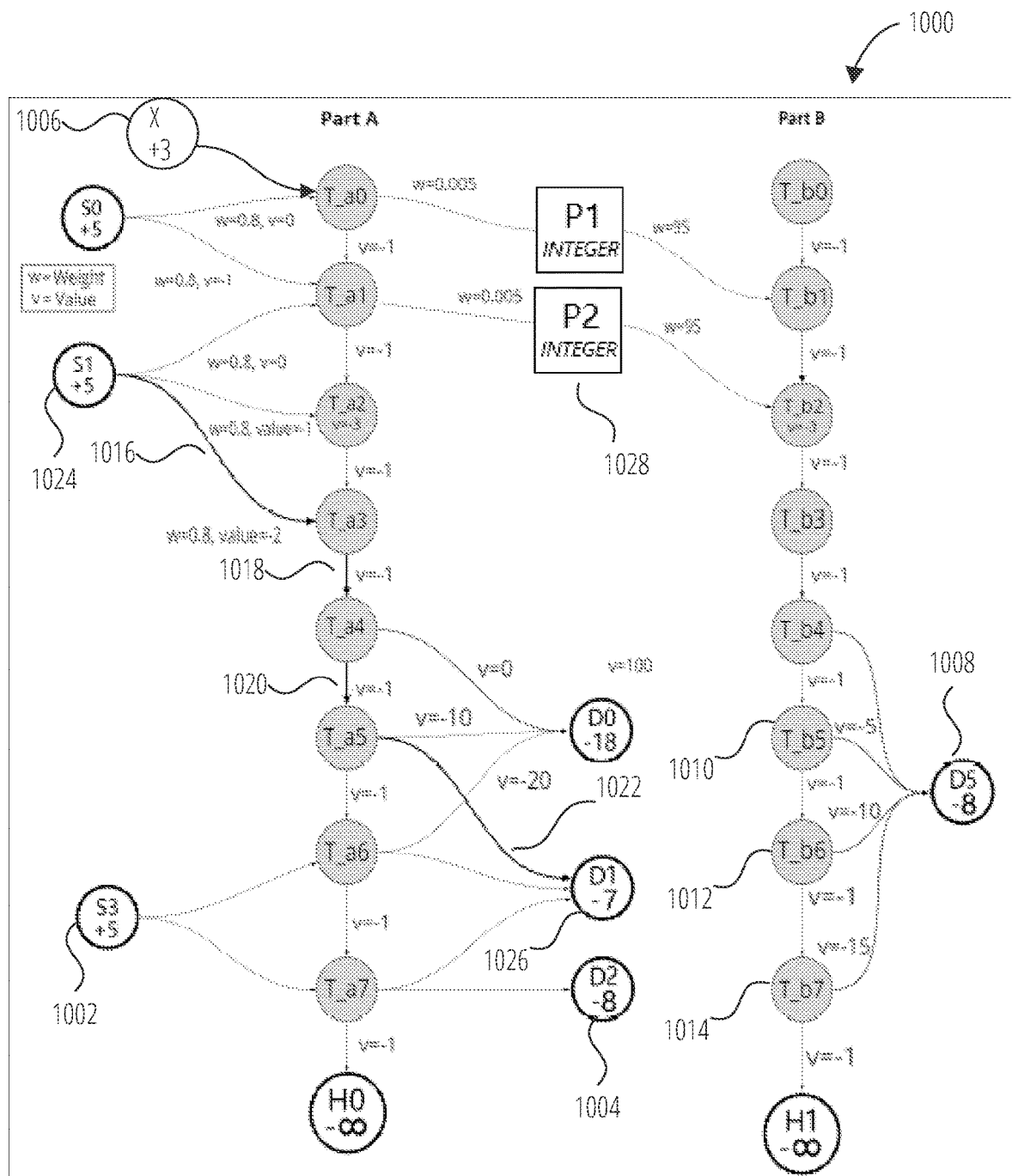
FIG. 10 illustrates a network representation.

FIG. 10 illustrates a network representation 1000 of a network with simple production. FIG. 10 illustrates a production network that represents a simple problem of balancing supply and demand of two parts (part 'A' and part 'B') over a 7-day horizon.

The network representation 1000 describes the way in which supply can flow or be transformed throughout the network. In the example network representation 1000, a shipment has a yield of 0.8 and can be delivered a day late to node T1 at a cost of −1 value per unit.

The nodes are as follows:
'S' nodes—Supply node. These are the inputs to the network—such as shipments received, or inventory that is available at the start of the planning horizon.
'D' nodes—Demand node. These are the outputs to the network.
'H' nodes—Horizon node. These are infinite demand nodes that represent the amount of inventory carried at the end of the planning horizon.
'T' nodes—Flow nodes These nodes represent standard mathematical nodes, with the standard flow constraint—sum of all in-flow equals the sum of all out-flow.
Square 'P' nodes—Production node. This is a node that has non-standard properties. It requires all arcs to the same amount of flow in and out of the node, and represents the concept of a "proportional flow constraint" as defined in academic literature. It can also have integral flow, be semi-continuous, or any other non-linear flow domain.

Quantities marked "+/−" on supply or demand nodes represents the amount of supply or the amount of demand. As an example, at 1002, supply node S3 has a surplus of 5 units, while at 1004, demand node D5 has a deficit of 8 units. Furthermore, at 1006, node X represents 3 units of Oh Hand, which is the number of units of Part A available in inventory at the start of the planning horizon.

Also, regarding the arcs (that is, connection between the various nodes):
The designation "w=" represents the weight of the arc. Flow along an arc is scaled by its weight; the flow_out= (weight)×(flow_in).
The designation "v=" represents the value of the arc. In the example network representation 1000, a shipment has a yield of 0.8 and can be delivered a day late to node T1 at a cost of value=−1, per unit. This is used by the optimization algorithms to assign a value to solutions. The goal of most processes is to maximize the value. As can be seen in FIG. 10, the cost of carrying inventory is v=−1, per unit, per day, in the series of arrows from node T_a0, to node T_a1, to node T_a2, to node T_a3, to node T_a4, to node T_a5, to node T_a6, to node T_a7, and so on. Furthermore, the flow from node T_b5 (1010) is a day late and penalized at v=−10, per unit. Furthermore, being late to satisfy the demand at node D5 (1306) is penalized by subtracting a value of 5 (i.e. v=−5) from each unit per day late. That is, for the arc from node T_b5 (1010) to node D5 (1006) has v=−5. One day later, the arc from node T_b6 (1012) to node D5 (1006) has v=−10. Finally, yet another day later, the arc from node T_b7 (1014) to node D5 (1006) has v=−15.

The bold arcs (1016, 1018, 1020, 1022) represent the cheapest way from supply node S1 (1024) to satisfy demand from node D1 (1026). In this example, the path is showing that the cheapest way to satisfy the 3 units of demand for the D1 node is to use pull it from the S1 supply node. This path is from S1 to T_a3, T_a3 to T_a4, T_a4 to T_a5, T_a5 to D1.

The P2 production node 1028 demonstrates how integrality and arc weights can be used to model batches and yields. This node has an integrality constraint that represent production in batches, so it consumes 200 input units per batch, and produces 95 output units. This is encoded in the weights. The weight on the input arc is 0.005, which means that 200 units of flow on the arc is scaled into 200×0.005=1 unit of flow coming out of the arc. This single unit of flow is put into the output arc which results in 1×95=95 units of output. The same applies to P1 production node.

In this example, the corresponding MIP has exactly three constraint categories which are described above (i.e. Balance constraints, incoming truck constraints, outgoing demand constraints):

Balance Constraints. These are the nodes which start with the letter "T_". In the MIP, the constraint represents the constraint that the amount of inventory at the end of the day is equal to the inventory at the start of the day, plus any supply received, minus any demand satisfied. For example, "T_a1" represents the balance of inventory of part A on day 1. In-arcs to this node represent positive entries in the balance sheet for the day, and out-arcs represent negative entries.

Incoming Supply Constraints. These are the nodes that start with the letter "S" and they represent a source of supply that can be utilized over multiple days, and make sure that the amount of it consumed is not equal to the total amount of supply.

Outgoing Demand Constraints. These are the nodes that start with the letter "D" and they represent a customer order that can be satisfied in parts over multiple days. The constraint in the MIP can ensure that the total amount satisfied over the multiple day period does not exceed the amount that the customer ordered.

The "P" nodes come from integer variables and the "H" nodes come from slack variables in the original model. So these nodes do not have corresponding constraints in the original MIP model.

In the example illustrated in FIG. 10, the original MIP would have had 22 constraints and would take $2^{22}$ iterations in order to brute force the directionality bit. However, since it is known that all of these constraints are generated from the same three sections of code based on the parameterized constraints of the mathematical formulation, it is a reasonable assumption that all have the same directionality bit. As a result, it only takes $2^3$ iterations to brute force the directionality bit of the 3 categories which is feasible. In many practical cases, although there may be millions of constraints, it is reasonable to expect there to only be tens of constraint categories which can be feasible for brute force. As a part of a solution design, the brute force method can be executed before the actual solve—therefore, the directionality bits can be stored and reused across multiple instances of a problem.

Figure 11:
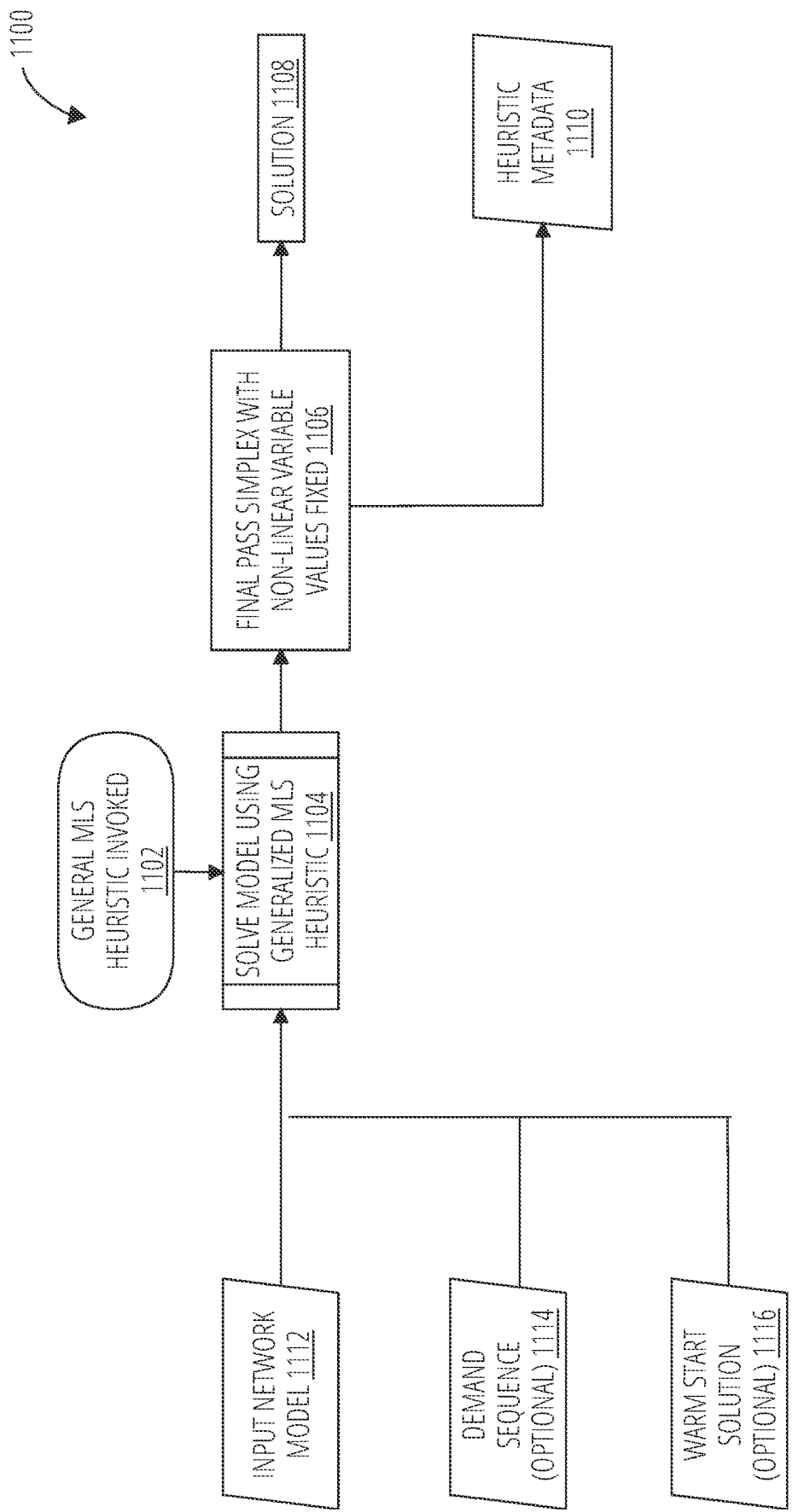
FIG. 11 illustrates a block diagram in accordance with one embodiment.

FIG. 11 illustrates a block diagram 1100 in accordance with one embodiment.

The parameterized heuristic comprises:
A sequence of demands
The percent of each demand to be satisfied in each pass
A warm start solution (which does not have to be feasible)
Block diagram 1100 illustrates a procedure which aims to satisfy demand on a node by pulling supply from each of the in-arcs to that node in some order until they have all been exhausted.

This is done as follows:
Production Nodes: Because of a proportional flow constraint across the arcs, the inflow of one arc may be gated by the in-flow of another. Therefore, a new scenario is created, and in that scenario, there is an attempt to pull from the in-arcs one by one. If a gating supply is encountered, then the production quantity is rounded down to fit within the gated supply. The scenario can be discarded, and there may be another attempt in a new scenario. If an in-arc is found to be gating, then it can be pushed to the front of the in-arc processing order.

Flow Nodes: The non-production nodes process a demand by trying to pull that much demand from each of their in arcs in order. Once no more supply is available from, it can be removed from the list of arcs in that scenario. The arc selection order may be updated after each top level demand is processed and, can be calculated using dynamic programming by iterating the nodes in topological order from supplies to demands, and picking the arc that has the cheapest cost (ignoring non-linear features of the network such as integrality and minimum quantities).

If a warm start solution has been provided, the arcs can be sorted first by their flow quantities in the warm start solution, and second, by the linear relaxation.

Scenarios: A light-weight form of scenarios can be used by storing scenario-specific state in "tracked buffers". These buffers tracking the offset and old value of every change made to them, and can be rewound by undoing the tracked changes one at a time in reverse order.

The systems and methods disclosed herein provide a fast and a good quality solution across a broad variety of network shapes. Furthermore, testing shows that solution quality can be greatly improved by optimizing the parameters listed above (a sequence of demands; the percent of each demand to be satisfied in each pass; and a warm start solution).

Demand sequence optimization using genetic programming provides excellent results. Its use, in the context of daily planning problems with weekly or monthly time horizons, can comprise: optimizing the demand sequence overnight; during the day, use the demand sequence from the night before so there can be quick reaction to small changes without having to compromise solution quality.

In 1110, heuristic metadata can comprise gating components, production decisions, and key bottlenecks.

Figure 12:
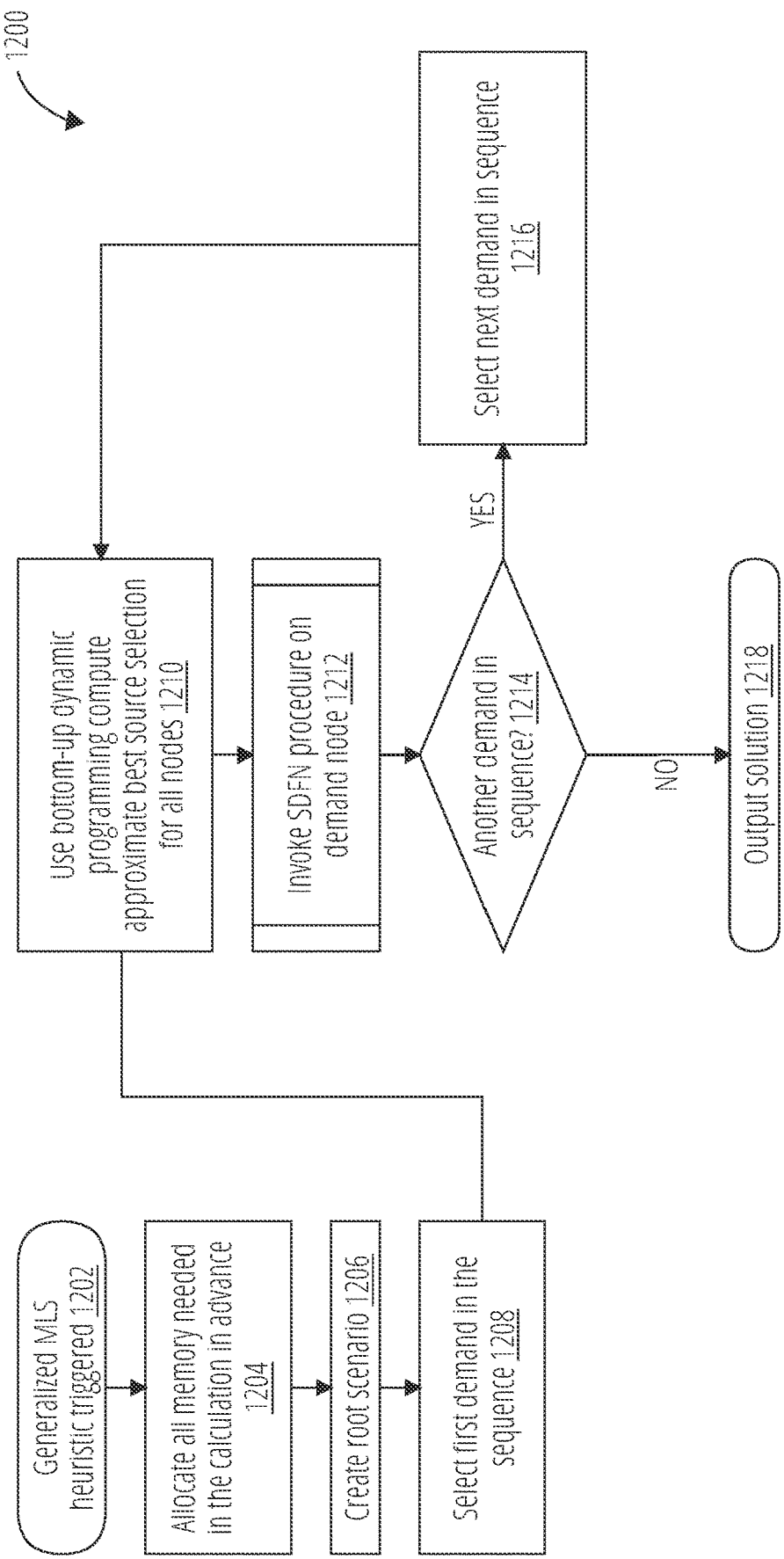
FIG. 12 illustrates a block diagram in accordance with one embodiment.
Figure 13:
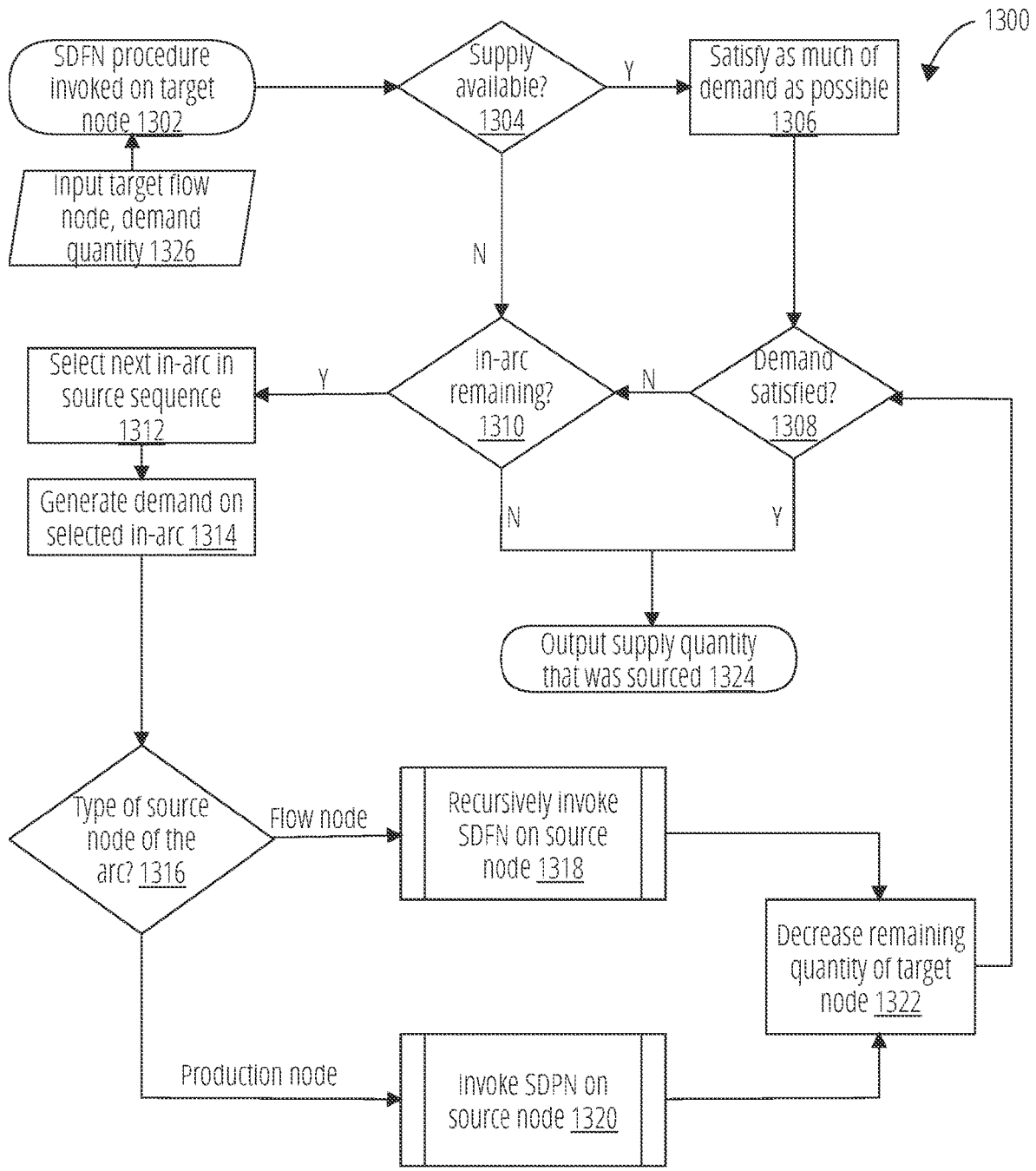
FIG. 13 illustrates a block diagram in accordance with one embodiment.
Figure 14:
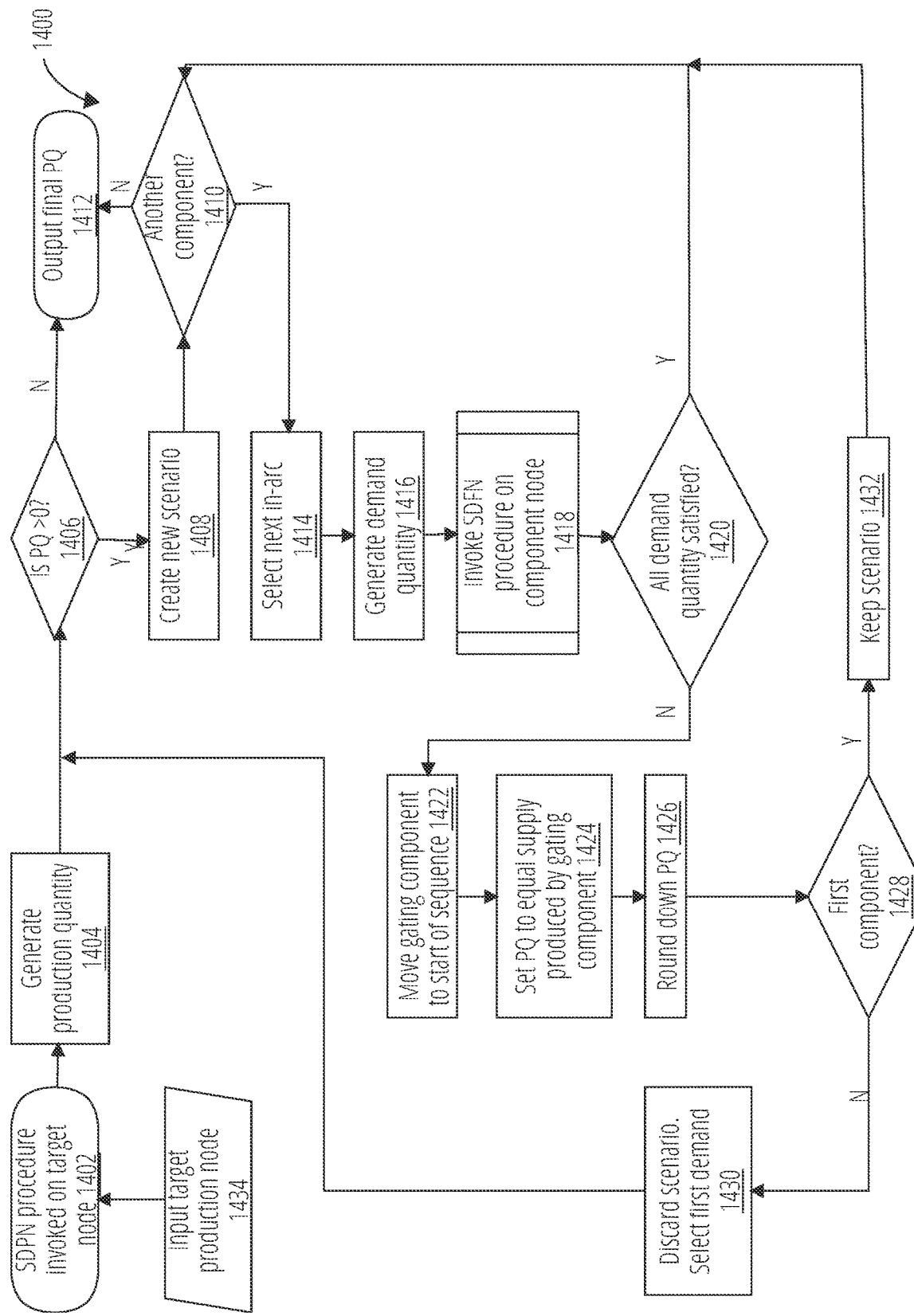
FIG. 14 illustrates a block diagram in accordance with one embodiment.

Subroutine block 1104 is further discussed in FIG. 12-FIG. 14.

Block diagrams shown in FIG. 12-FIG. 14 provide a detailed description of a procedure that may be used to quickly solve a production network using a Generalized MLS Algorithm. FIG. 12 illustrates a block diagram 1200 on how to process the sequence of top level demands. The acronym "SDFN" refers to "Satisfy Demand on a Flow Node".

At 1202, a generalized MLS heuristic is triggered. Next, at block 1204, the calculation's temporary data structures are pre-allocated to avoid allocations during execution. That is, memory needed in the calculation is allocated in advance. This can be cached to avoid re-allocation between runs if only the demand sequence has changed. Memory allocation is often a bottleneck, and allocating memory in advance often speeds the process quite a bit. Next, at block 1206, a root scenario is calculated. The first demand in the sequence is selected at block 1208. Using bottom-up dynamic programming, at block 1210, the approximate best source selection is computed for all nodes below, and including the selected demand node. This uses up-to-date information non supply availability and production excess. An SDFN procedure is invoked on the selected demand node on its demand quantity at subroutine block 1212. An embodiment of the SDFN procedure is shown in FIG. 13.

If there is another demand in the sequence ('yes' at decision block 1214), then the next demand in the sequence is selected at block 1216, and the procedure reverts to block 1210.

On the other hand, if there is no further demand in the sequence ('no' at decision block 1214), then the procedure ends, and the solution is output at 1218.

FIG. 13 illustrates a block diagram 1300 on how to satisfy demand on a flow node, in accordance with one embodiment. The acronym "SDFN" refers to "Satisfy Demand on a Flow Node". The acronym "SDPN" refers to "Satisfy Demand on a Production Node";

At 1302, an SDFN procedure is invoked on a target node. Inputs to 1302 comprise: a target flow node and demand quantity. The input 1326 also comprises a calculation state of: excess supply quantities; and a source selection sequence. Next the target node is examined to see if has supply available at decision block 1304.

If the answer is 'no' at decision block 1304, then there is a check to see if there is a remaining in-arc in the source sequence at decision block 1310. If the answer is 'no' at decision block 1310, then the procedure ends at 1324 and the quantity of supply that was sourced, is output. If the answer is 'yes' at decision block 1310, then the next in-arc in the source sequence is selected at block 1312. Demand on the selected source in-arc is generated, which is equal to the remaining unsatisfied quantity divided by the weight of the arc, at block 1314.

Next, at decision block 1316, the type of source node of the arc determines the subsequent step. If the source node is a Flow Node, then the SDFN procedure is recursively invoked on the source node, using the generated demand quantity, followed by block 1322, where the remaining demand quantity of the target node is decreased by the amount of supply that was pulled from the source. The procedure then moves to decision block 1308 to see of all the demand has been satisfied on the target node. If the answer is 'no' at decision block 1308, then the procedure returns to decision block 1310 to see if there are any remaining in-arcs in the source sequence. If, on the other hand, the answer is 'yes' at decision block 1308, the procedure ends at 1324 and the quantity of supply that was sourced, is output.

If, on the other hand, at decision block 1316, the type of source node of the arc is a Production Node, then the SDPN procedure is invoked on the source node, using the generated demand quantity. The SDPN procedure is further described in FIG. 14. Block 1322 follows, where the remaining demand quantity of the target node is decreased by the amount of supply that was pulled from the source. The procedure then moves to decision block 1308 to see of all the demand has been satisfied on the target node. If the answer is 'no' at decision block 1308, then the procedure returns to decision block 1310 to see if there are any remaining in-arcs in the source sequence. If, on the other hand, the answer is 'yes' at decision block 1308, the procedure ends at 1324 and the quantity of supply that was sourced, is output.

Back at decision block 1304, if the answer is 'yes', the demands is satisfied as much as possible using the available supply at block 1306. Next, at decision block 1308, there is a check to see if all of the demand has been satisfied on the target node. If the answer is 'no' at decision block 1308, then the procedure returns to decision block 1310 to see if there are any remaining in-arcs in the source sequence. If, on the other hand, the answer is 'yes' at decision block 1308, the procedure ends at 1324 and the quantity of supply that was sourced, is output.

FIG. 14 illustrates a block diagram 1400 on how to satisfy demand on a production node, in accordance with one embodiment. The acronym "SDPN" refers to "Satisfy Demand on a Production Node"; the acronym "SDFN" refers to "Satisfy Demand on a Flow Node", while the acronym "PQ" refers to "Production Quantity".

At 1402, an SDPN procedure is invoked on a target node. Inputs to 1402 comprise: a target production node and a demand quantity. The input 1434 also comprises a calculation state of a component sequence.

Next, at block 1404, the demand quantity is rounded up according to the rounding rules of the target node. This is the production quantity, which is then checked at decision block 1406 to see if it is greater than zero. If 'no', the procedure is completed at 1412, and the final production quantity is output.

If 'yes' at decision block 1406, then a new scenario is created at block 1408, which is a child of the current scenario. This can serve as a checkpoint for backtracking. Next, there is a check to see if there is another component in the sequence at decision block 1410. If 'no', then the procedure is completed at 1412, and the final production quantity is output.

If 'yes' at decision block 1410, then the next in-arc in the component sequence is selected at block 1414. A demand quantity on the source node of the component arc is generated at block 1416; the demand quantity is equal to the production quantity divided by the weight of the arc. Next, an SDFN procedure on the component node is invoked at subroutine block 1418; the generated demand quantity is used in the SDFN.

If all the demand quantity is satisfied ('yes') at decision block 1420, then the procedure checks to see if there is another component in the sequence at decision block 1410.

If, on the other hand, all the demand quantity is not satisfied ('no') at decision block 1420, the procedure moves to block 1422, where the gating component moves to the start of the component sequence in global state that will be unaffected by the backtrack. Next, the production quantity is set to be equal to the amount of supply that the gating component was able to produce at block 1424. The production quantity is then rounded down according to the rounding rules of the target node at block 1426.

If this is the first component in the sequence ('yes' at decision block 1428), then there is no need to discard the scenario at block 1432, and there is a check to see if there is another component in the sequence at decision block 1410.

If, on the other hand, this is not the first component in the sequence ('no' at decision block 1428), then the current scenario is discarded at block 1430, and there is a restart by selecting the first demand in the sequence (which is the demand that was just identified as gating). The procedure then checks the production quantity at decision block 1406 to see if it is greater than zero.

Example

Consider the following problem and its MIP model: one part, with a scheduled receipt SR and a delayable demand and a 3 day planning horizon.

Variables:
  b0, b1, b2 are balance carried at the end of day 0, 1, 2 (BalQ)
  s0, s1, s2 are amount of SR received on day 0, 1, 2 (SRQ)
  d0, d1, d2 are quantity of demand satisfied on day 0, 1, 2 (IDQ)
  r is the remaining SR unused quantity (SRUnusedQ)
  u is the unsatisfied IDQ quantity (IDUnsatisQ)

Constraints:
  Bal0, Bal1, Bal2: are daily balance constraints for days 0, 1, 2. They ensure for a given day supply and demand are balanced.
  SREff: is the constraint for the SR to ensure supply in, is equal to supply out, and apply SRUnused penalty.

ID: is the constraint to for the independent demand to ensure the quantity is not exceeded and unsatisfied penalty.
Objective Coefficients:

w_bi, the cost of carrying inventory from day i to day i−1, per unit of inventory w_si, the cost of receiving the SR on day i, per unit of quantity received w_di, the cost of satisfying the ID on day i, per unit of demand satisfied w_r the cost of not receiving the SR, per unit of SR quantity w_u the cost of not satisfying the ID, per unit of demand quantity Constants:
 H—starting on-hand balance
 D—independent demand quantity
 S—scheduled receipt quantity Linear Programming Formulation of the above Example
 Minimize: b0.w_b0+b1.w_b1+x2.w_b2+s0.w_s0+s1.w_s1+s2.w_s2+d0.w_d0+d1.w_d1+d2.w_d2+r.w_r+u.w_u
 Subject To (the following constraints):
 (balance constraints)
 Bal0: s0−d0−b0=−H
 Bal1: b0+s1−d1−b1=0
 Bal2: b1+s2−d2−b2=0 (b2 is a free variable)
 (supply/demand constraints)
 SREff: s0+s1+s2+r=S (r is a free variable)
 ID: d0+d1+d2+u=D (u is a free variable)
 Here is the variable-aligned view:
 Bal0: −b0+s0−d0=−H
 Bal1: +b0−b1+s1−d1=0
 Bal2: b1−b2+s2−d2=0
 SREff: −s0−s1−s2−r=−S
 ID: +d0+d1+d2+u=D Network Formulation of the Above Example FIG. 15 illustrates a comparison of run times in accordance with one embodiment.

Table 1502 summarizes the run time for optimization for four different time horizons (1 week, 2 weeks, 3 weeks and 4 weeks) using the network solver and the conventional MIP approach.

For the 1 week time horizon, the network solver requires 2.78 sec, compared to 53.49 sec for the standard MIP approach.

For the 2-week, 3-week and 4-week time horizons, the MIP optimization maxes out at 3600 sec (i.e. 1 hour). That is, after 1 hour, the MIP optimization has not completed the optimization process. In contrast, the network solver is able to provide an optimization for under 7 seconds for each time horizon: 3.7 sec for a 2-week time horizon; 4.98 sec for a 3-233 k horizon; and 6.23 sec for a 4-week time horizon. This illustrates the enhanced speed of computer operation using the network solver method.

Figure 16A:
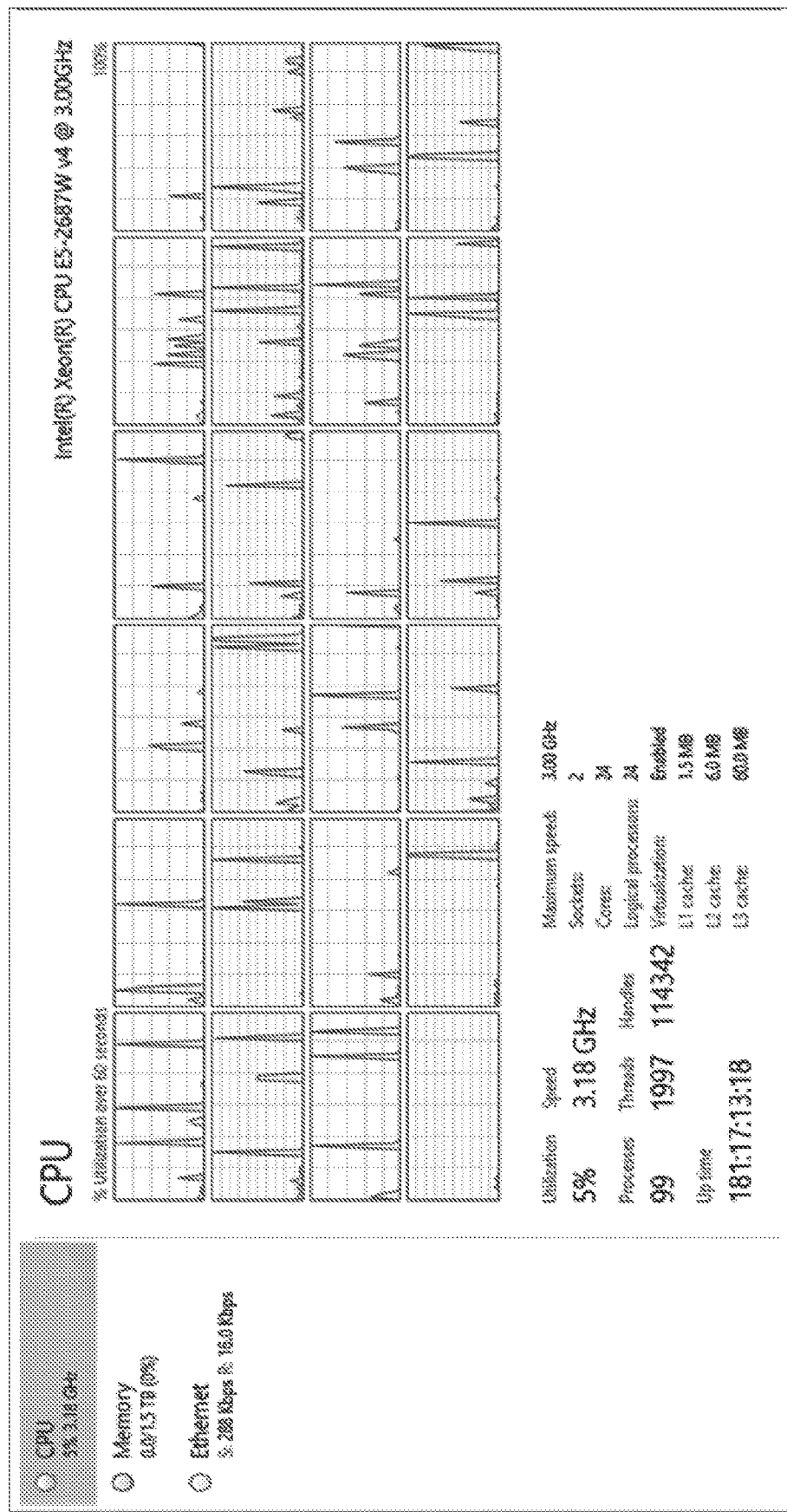
FIG. 16A illustrates processing power used in conjunction with a Network Solver in accordance with one embodiment.

FIG. 16A illustrates processing power used in conjunction with a Network Solver in accordance with one embodiment.

When comparing network solver and MIP optimization methods, the total processing power, consisting of number of CPUs multiplied by the processing time, can be compared. For an optimization process shown in FIG. 16A, the network solver uses 1 CPU for approximately 35 sec, resulting in total processing power of 35 CPU-sec. When MIP is used for the same optimization problem, using 22 (out of 24) processors, a total processing power of 223,000 CPU-seconds are used. This illustrates the higher efficiency of computer operation using the network solver method. That is, less hardware (in terms of CPUs) is used with the network solver, when compared to the MIP.

Figure 16B:
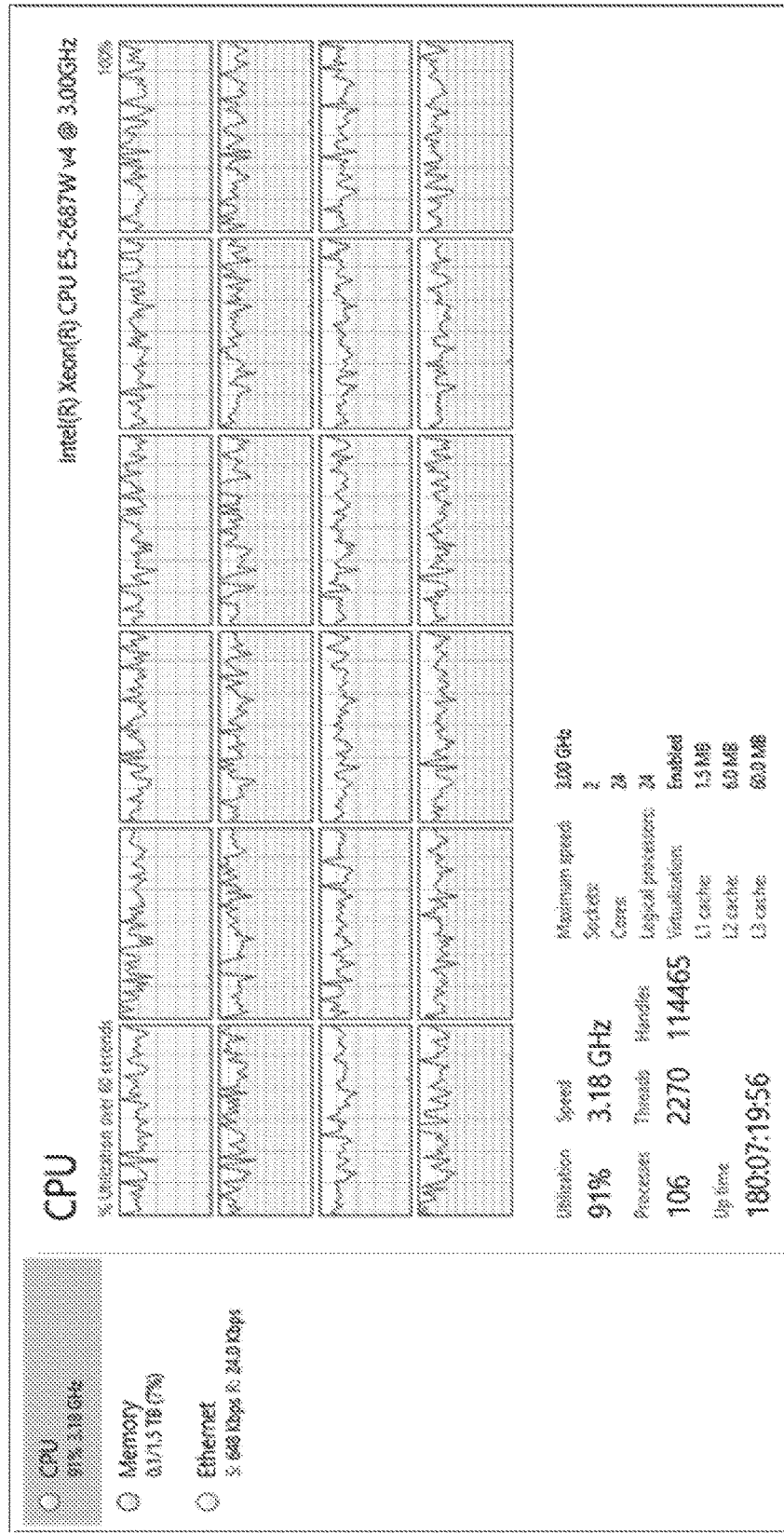
FIG. 16B illustrates processing power used in conjunction with an MIP, for the same problem solved by a Network Solver in FIG. 16A.

FIG. 16B illustrates processing power used in conjunction with an MIP, for the same problem solved by a Network Solver in FIG. 16A. When MIP is used for the same optimization problem, using 22 (out of 24) processors, a total processing power of 223,000 CPU-seconds are used. This illustrates the higher efficiency of computer operation using the network solver method. That is, less hardware (in terms of CPUs) is used with the network solver, when compared to the MIP.

Figure 17:
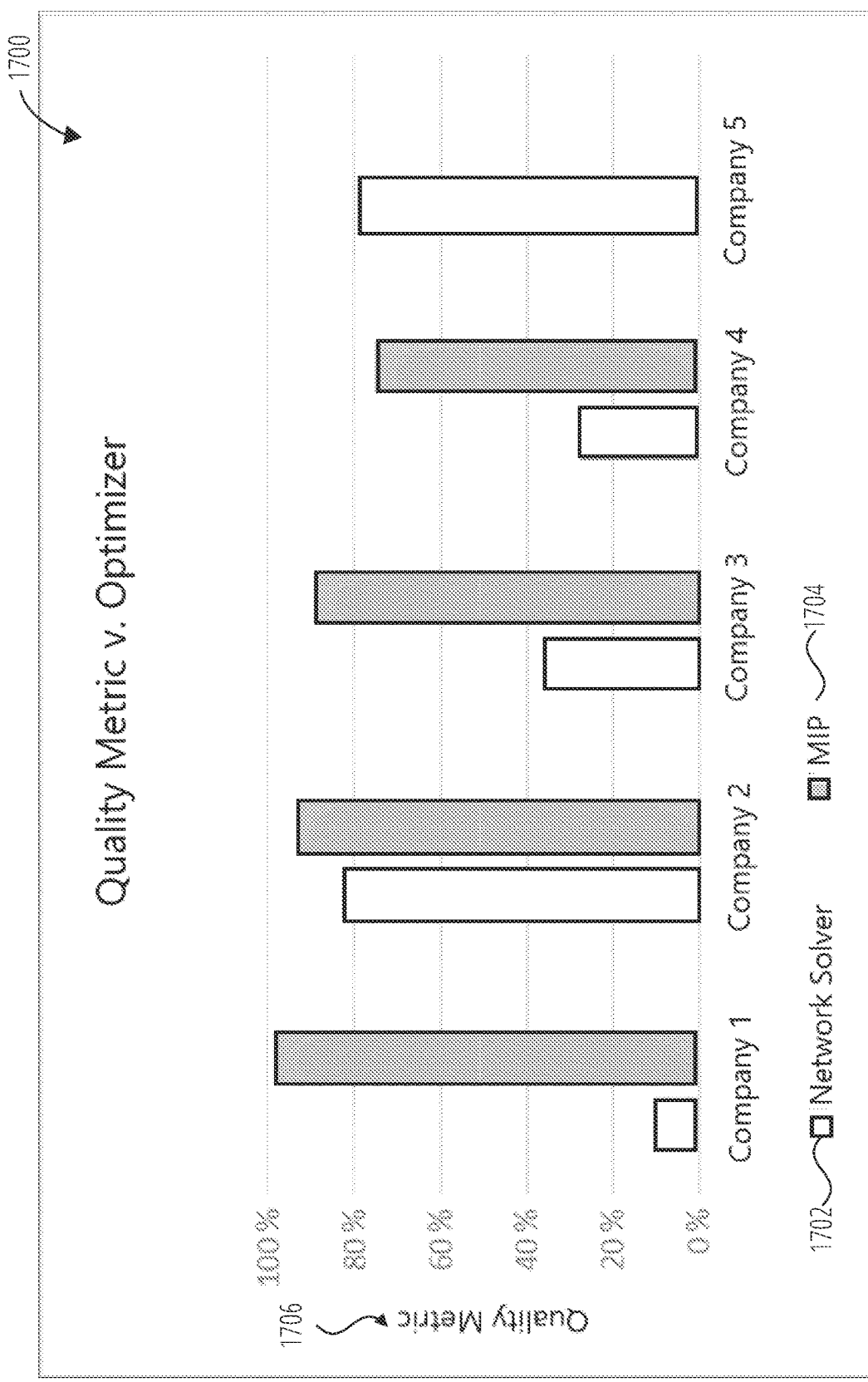
FIG. 17 illustrates a performance metric in accordance with one embodiment.

FIG. 17 illustrates a performance metric 1700 in accordance with one embodiment. Here, a quality metric of a result obtained by a Network Solver 1702 is compared to that obtained by an MIP Solver 1704, for five different data sets (Company 1, Company 2, Company 3, Company 4, Company 5). The quality metric in FIG. 17 is an MIP Gap, which refers to the gap between a solution obtained using a full optimization algorithm and the respective solver. In FIG. 17, the MIP solver 1704 was set up to time out after 1 hour of execution time.

A full optimization algorithm provides a highly accurate solution, yet takes a large number of computer resources and a long run-time to execute, when compared to either the Network Solver 1702 and the MIP Solver 1704. The Quality Metric 1706, also known as the MIP gap, is a measure of how far apart a solution obtained from a respective solver is, compared to the solution obtained by a full optimization solver. The larger the difference, or gap, the less accurate the solution. Thus, a larger gap size indicates a poorer-quality solution.

According to the chart shown in FIG. 17, the solution obtained by the Network Solver 1702 is consistently of higher quality than that obtained by the MIP Solver 1704. For Company 1, the Network Solver has a gap measure of 10%, as opposed to almost 100% obtained by the MIP solver. For Company 2, the Network Solver has a gap measure of about 80%, as opposed to about 90% obtained by the MIP solver. For Company 3, the Network Solver has a gap measure of about 35%, as opposed to about 90% obtained by the MIP solver. For Company 4, the Network Solver has a gap measure of about 30%, as opposed to about 75% obtained by the MIP solver. Finally, for Company 5, the Network Solver has a gap measure of about 80%, whereas the MIP solver timed-out before arriving at a solution.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   constructing, by a processor, a representation of a Mixed Integer Programming (MIP) problem by defining nodes and arcs that are parametrized independent of input data;
   generating, by the processor, one or more flow nodes, one or more production nodes and one or more arcs in a production network model for specific instances of the MIP problem by mapping the input data to parameters, each production node incorporating variables that are in three or more constraints, with the production network model incorporating one or more directionality bits; and
   determining, by the processor, a solution to the representation of the MIP problem based on feasible flows on the arcs in conjunction with a parametrized multi-level search heuristic.

2. The computer-implemented method of claim 1, wherein input into the parametrized multi-level search heuristic comprises: a sequence of demands; a percentage of each demand to be satisfied in each pass; and a warm start solution.

3. The computer-implemented method of claim 2, wherein the arcs can be sorted first by their respective flow quantities in the warm start solution, and second, by linear relaxation.

4. The computer-implemented method of claim 2, wherein the parametrized multi-level search heuristic comprises bottom-up dynamic programming.

5. The computer-implemented method of claim 1, wherein the three or more constraints are each annotated with a category; and a directionality of each constraint within the category is inferred.

6. A computing apparatus comprising:
   a processor; and
   a memory storing instructions that, when executed by the processor, configure the apparatus to:
   construct, by the processor, a representation of a Mixed Integer Programming (MIP) problem by defining nodes and arcs that are parametrized independent of input data;
   generate, by the processor, one or more flow nodes, one or more production nodes and one or more arcs in a production network model for specific instances of the MIP problem by mapping the input data to parameters, each production node incorporating variables that are in three or more constraints, with the production network model incorporating one or more directionality bits; and
   determine, by the processor, a solution to the representation of the MIP problem based on feasible flows on the arcs in conjunction with a parametrized multi-level search heuristic.

7. The computing apparatus of claim 6, wherein input into the parametrized multi-level search heuristic comprises: a sequence of demands; a percentage of each demand to be satisfied in each pass; and a warm start solution.

8. The computing apparatus of claim 7, wherein the arcs can be sorted first by their respective flow quantities in the warm start solution, and second, by linear relaxation.

9. The computing apparatus of claim 7, wherein the parametrized multi-level search heuristic comprises bottom-up dynamic programming.

10. The computing apparatus of claim 6, wherein the three or more constraints are each annotated with a category; and a directionality of each constraint within the category is inferred.

11. A non-transitory computer-readable storage medium, the computer-readable storage medium including instructions that when executed by a computer, cause the computer to:
    construct, by a processor, a representation of a Mixed Integer Programming (MIP) problem by defining nodes and arcs that are parametrized independent of input data;
    generate, by the processor, one or more flow nodes, one or more production nodes and one or more arcs in a production network model for specific instances of the MIP problem by mapping the input data to parameters, each production node incorporating variables that are in three or more constraints, with the production network model incorporating one or more directionality bits; and
    determine, by the processor, a solution to the representation of the MIP problem based on feasible flows on the arcs in conjunction with a parametrized multi-level search heuristic.

12. The non-transitory computer-readable storage medium of claim 11, wherein input into the parametrized multi-level search heuristic comprises: a sequence of demands; a percentage of each demand to be satisfied in each pass; and a warm start solution.

13. The non-transitory computer-readable storage medium of claim 12, wherein the arcs can be sorted first by their respective flow quantities in the warm start solution, and second, by linear relaxation.

14. The non-transitory computer-readable storage medium of claim 12, wherein the parametrized multi-level search heuristic comprises bottom-up dynamic programming.

15. The non-transitory computer-readable storage medium of claim 11, wherein the three or more constraints are each annotated with a category; and a directionality of each constraint within the category is inferred.

* * * * *